(12) United States Patent
Murata et al.

(10) Patent No.: US 7,572,200 B2
(45) Date of Patent: Aug. 11, 2009

(54) CHAIN DRIVE SYSTEM

(75) Inventors: Takashi Murata, Yokohama (JP); Takuya Hirata, Yokohama (JP); Makoto Kano, Yokohama (JP); Yutaka Mabuchi, Yokohama (JP); Takahiro Hamada, Yokohama (JP); Masashi Yamaguchi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 467 days.

(21) Appl. No.: 10/914,276

(22) Filed: Aug. 10, 2004

(65) Prior Publication Data

US 2005/0037879 A1 Feb. 17, 2005

(30) Foreign Application Priority Data

Aug. 13, 2003 (JP) ............................. 2003-207494

(51) Int. Cl.
*F16G 1/28* (2006.01)
*F16G 13/02* (2006.01)
*F16H 7/18* (2006.01)

(52) U.S. Cl. .................. 474/202; 474/111; 474/109; 474/148; 474/206

(58) Field of Classification Search .............. 474/202, 474/206, 207, 217, 212–215, 228–231, 101, 474/110–111, 148; 59/5, 8, 351.1, 78; 428/408, 428/698; 508/291, 371, 486; 148/211; 198/893
See application file for complete search history.

(56) References Cited

U.S. PATENT DOCUMENTS

| 1,461 A | 12/1839 | Day |
| 1,551,764 A * | 9/1925 | Muller ........................ 148/211 |
| 2,716,972 A | 9/1955 | Farny et al. |
| 2,982,733 A | 5/1961 | Wright et al. |
| 3,211,647 A | 10/1965 | O'Halloran et al. |
| 3,790,315 A | 2/1974 | Emanuelsson et al. |
| 3,846,162 A | 11/1974 | Bloom |
| 3,932,228 A | 1/1976 | Sugiyama et al. |
| 4,031,023 A | 6/1977 | Musser et al. |

(Continued)

FOREIGN PATENT DOCUMENTS

CA 2009582 8/1990

(Continued)

OTHER PUBLICATIONS

U.S. Appl. No. 10/914,506, filed Aug. 10, 2004, Nishimura et al.

(Continued)

*Primary Examiner*—Marcus Charles
(74) *Attorney, Agent, or Firm*—Foley & Lardner LLP

(57) ABSTRACT

A chain drive system includes a drive sprocket, a driven sprocket and a chain looped over the drive sprocket and the driven sprocket. The chain and the sprocket having respective sliding surfaces slidable relative to each other in the presence of lubricating oil, and any adjacent chain components of the chain having respective sliding surfaces slidable relative to each other in the presence of lubricating oil. At least one of the sliding surfaces between the chain and the sprocket and at least one of the sliding surfaces between any adjacent chain components have hard carbon coatings formed on base portions thereof. Each of the hard carbon coatings has a hydrogen content of 10 atomic % or less.

24 Claims, 5 Drawing Sheets

U.S. PATENT DOCUMENTS

| | | |
|---|---|---|
| 4,367,130 A | 1/1983 | Lemelson |
| 4,385,880 A | 5/1983 | Lemelson |
| 4,538,929 A | 9/1985 | Ehrentraut et al. |
| 4,554,208 A | 11/1985 | MacIver et al. |
| 4,645,610 A | 2/1987 | Born et al. |
| 4,702,808 A | 10/1987 | Lemelson |
| 4,712,982 A | 12/1987 | Inagaki et al. |
| 4,755,237 A | 7/1988 | Lemelson |
| 4,755,426 A | 7/1988 | Kokai et al. |
| 4,783,368 A | 11/1988 | Yamamoto et al. |
| 4,834,400 A | 5/1989 | Lebeck |
| 4,842,755 A | 6/1989 | Dunn |
| 4,859,493 A | 8/1989 | Lemelson |
| 4,874,596 A | 10/1989 | Lemelson |
| 4,919,974 A | 4/1990 | McCune et al. |
| 4,933,058 A | 6/1990 | Bache et al. |
| 4,943,345 A | 7/1990 | Asmussen et al. |
| 4,960,643 A | 10/1990 | Lemelson |
| 4,974,498 A | 12/1990 | Lemelson |
| 4,980,021 A | 12/1990 | Kitamura et al. |
| 4,980,610 A | 12/1990 | Varga |
| 4,981,717 A | 1/1991 | Thaler |
| 4,988,421 A | 1/1991 | Drawl et al. |
| 4,992,082 A | 2/1991 | Drawl et al. |
| 5,000,541 A | 3/1991 | DiMarcello et al. |
| 5,021,628 A | 6/1991 | Lemelson |
| 5,032,243 A | 7/1991 | Bache et al. |
| 5,036,211 A | 7/1991 | Scott |
| 5,040,501 A | 8/1991 | Lemelson |
| 5,067,826 A | 11/1991 | Lemelson |
| 5,077,990 A | 1/1992 | Plath |
| 5,078,848 A | 1/1992 | Anttila et al. |
| 5,087,608 A | 2/1992 | Chan et al. |
| 5,096,352 A | 3/1992 | Lemelson |
| 5,110,435 A | 5/1992 | Haberland |
| 5,112,025 A | 5/1992 | Nakayama et al. |
| 5,127,314 A | 7/1992 | Swain |
| 5,131,941 A | 7/1992 | Lemelson |
| 5,132,587 A | 7/1992 | Lemelson |
| 5,142,785 A | 9/1992 | Grewal et al. |
| 5,143,634 A | 9/1992 | Quinga et al. |
| 5,148,780 A | 9/1992 | Urano et al. |
| 5,187,021 A | 2/1993 | Vydra et al. |
| 5,190,807 A | 3/1993 | Kimock et al. |
| 5,190,824 A | 3/1993 | Itoh |
| 5,202,156 A | 4/1993 | Yamamoto et al. |
| 5,205,188 A | 4/1993 | Repenning et al. |
| 5,205,305 A | 4/1993 | Yamakita |
| H1210 H | 7/1993 | Jansen |
| 5,232,568 A | 8/1993 | Parent et al. |
| 5,237,967 A | 8/1993 | Willermet et al. |
| 5,249,554 A | 10/1993 | Tamor et al. |
| 5,255,783 A | 10/1993 | Goodman et al. |
| 5,255,929 A | 10/1993 | Lemelson |
| 5,284,394 A | 2/1994 | Lemelson |
| 5,288,556 A | 2/1994 | Lemelson |
| 5,295,305 A | 3/1994 | Hahn et al. |
| 5,299,937 A | 4/1994 | Gow |
| 5,317,938 A | 6/1994 | de Juan, Jr. et al. |
| 5,326,488 A | 7/1994 | Minokami et al. |
| 5,332,348 A | 7/1994 | Lemelson |
| 5,334,306 A | 8/1994 | Dautremont-Smith et al. |
| 5,349,265 A | 9/1994 | Lemelson |
| 5,358,402 A | 10/1994 | Reed et al. |
| 5,359,170 A | 10/1994 | Chen et al. |
| 5,360,227 A | 11/1994 | Lemelson |
| 5,380,196 A | 1/1995 | Kelly et al. |
| 5,401,543 A | 3/1995 | O'Neil et al. |
| H1461 H | 7/1995 | DiVita et al. |
| 5,432,539 A | 7/1995 | Anderson |
| 5,433,977 A | 7/1995 | Sarin et al. |
| H1471 H | 8/1995 | Braun et al. |
| 5,443,032 A | 8/1995 | Vichr et al. |
| 5,447,208 A | 9/1995 | Lund et al. |
| 5,456,406 A | 10/1995 | Lemelson |
| 5,458,754 A | 10/1995 | Sathrum et al. |
| 5,461,648 A | 10/1995 | Nauflett et al. |
| 5,462,772 A | 10/1995 | Lemelson |
| 5,464,667 A | 11/1995 | Köhler et al. |
| 5,466,431 A | 11/1995 | Dorfman et al. |
| 5,479,069 A | 12/1995 | Winsor |
| 5,482,602 A | 1/1996 | Cooper et al. |
| 5,491,028 A | 2/1996 | Sarin et al. |
| 5,497,550 A | 3/1996 | Trotta et al. |
| 5,509,841 A | 4/1996 | Winsor |
| 5,516,729 A | 5/1996 | Dawson et al. |
| 5,529,815 A | 6/1996 | Lemelson |
| 5,531,878 A | 7/1996 | Vadgama et al. |
| 5,541,566 A | 7/1996 | Deeney |
| 5,547,716 A | 8/1996 | Thaler |
| 5,551,959 A | 9/1996 | Martin et al. |
| 5,552,675 A | 9/1996 | Lemelson |
| 5,568,391 A | 10/1996 | Mckee |
| 5,593,719 A | 1/1997 | Dearnaley et al. |
| 5,616,372 A | 4/1997 | Conley et al. |
| 5,619,889 A | 4/1997 | Jones et al. |
| 5,628,881 A | 5/1997 | Lemelson |
| 5,630,275 A | 5/1997 | Wexler |
| 5,630,953 A | 5/1997 | Klink |
| 5,653,300 A | 8/1997 | Lund et al. |
| 5,669,144 A | 9/1997 | Hahn et al. |
| 5,672,054 A | 9/1997 | Cooper et al. |
| 5,688,557 A | 11/1997 | Lemelson et al. |
| 5,707,409 A | 1/1998 | Martin et al. |
| 5,714,202 A | 2/1998 | Lemelson et al. |
| 5,719,109 A | 2/1998 | Tokashiki et al. |
| 5,723,207 A | 3/1998 | Lettington et al. |
| 5,731,046 A | 3/1998 | Mistry et al. |
| 5,735,769 A | 4/1998 | Takemura et al. |
| 5,740,941 A | 4/1998 | Lemelson |
| 5,775,817 A | 7/1998 | Gottemoller et al. |
| 5,786,038 A | 7/1998 | Conley et al. |
| 5,790,146 A | 8/1998 | Anderson |
| 5,793,390 A | 8/1998 | Claflin et al. |
| 5,794,801 A | 8/1998 | Lemelson |
| 5,799,549 A | 9/1998 | Decker et al. |
| 5,806,557 A | 9/1998 | Helge |
| 5,824,387 A | 10/1998 | Boutaghou et al. |
| 5,834,708 A | 11/1998 | Svetal et al. |
| 5,840,662 A | 11/1998 | Nibert et al. |
| 5,843,571 A | 12/1998 | Sho |
| 5,851,962 A | 12/1998 | Kaga |
| 5,866,195 A | 2/1999 | Lemelson |
| 5,871,805 A | 2/1999 | Lemelson |
| 5,881,444 A | 3/1999 | Schaefer et al. |
| 5,901,021 A | 5/1999 | Hirano et al. |
| 5,910,940 A | 6/1999 | Guerra |
| 5,927,897 A | 7/1999 | Attar |
| 5,937,812 A | 8/1999 | Reedy et al. |
| 5,940,975 A | 8/1999 | Decker et al. |
| 5,945,214 A | 8/1999 | Ma et al. |
| 5,947,710 A | 9/1999 | Cooper et al. |
| 5,952,102 A | 9/1999 | Cutler |
| 5,958,261 A | 9/1999 | Offer et al. |
| 5,960,762 A | 10/1999 | Imai |
| 5,967,250 A | 10/1999 | Lund et al. |
| 5,968,596 A | 10/1999 | Ma et al. |
| 5,975,686 A | 11/1999 | Hauck et al. |
| 5,976,707 A | 11/1999 | Grab |
| 5,992,268 A | 11/1999 | Decker et al. |
| 5,993,938 A | 11/1999 | Tsukuda et al. |
| 6,006,415 A | 12/1999 | Schaefer et al. |
| 6,015,597 A | 1/2000 | David |
| 6,016,000 A | 1/2000 | Moslehi |

| Patent | Kind | Date | Inventor |
|---|---|---|---|
| 6,023,979 | A | 2/2000 | Bills et al. |
| 6,028,393 | A | 2/2000 | Izu et al. |
| 6,051,298 | A | 4/2000 | Ko et al. |
| 6,056,443 | A | 5/2000 | Koike et al. |
| 6,059,460 | A | 5/2000 | Ono et al. |
| 6,059,830 | A | 5/2000 | Lippincott, III et al. |
| 6,068,568 | A | 5/2000 | Kozakura et al. |
| 6,071,597 | A | 6/2000 | Yang et al. |
| 6,083,313 | A | 7/2000 | Venkatraman et al. |
| 6,083,570 | A | 7/2000 | Lemelson et al. |
| 6,095,690 | A | 8/2000 | Niegel et al. |
| 6,099,541 | A | 8/2000 | Klopotek |
| 6,099,976 | A | 8/2000 | Lemelson et al. |
| 6,106,919 | A | 8/2000 | Lee et al. |
| 6,124,198 | A | 9/2000 | Moslehi |
| 6,139,964 | A | 10/2000 | Sathrum et al. |
| 6,142,481 | A | 11/2000 | Iwashita et al. |
| 6,145,608 | A | 11/2000 | Lund et al. |
| 6,156,439 | A | 12/2000 | Coffinberry |
| 6,159,558 | A | 12/2000 | Wolfe et al. |
| 6,160,683 | A | 12/2000 | Boutaghou |
| 6,165,616 | A | 12/2000 | Lemelson et al. |
| 6,170,156 | B1 | 1/2001 | Lev et al. |
| 6,171,343 | B1 | 1/2001 | Dearnaley et al. |
| 6,173,913 | B1 | 1/2001 | Shafer et al. |
| 6,190,514 | B1 | 2/2001 | Ma et al. |
| 6,193,906 | B1 | 2/2001 | Kaneko et al. |
| 6,197,120 | B1 | 3/2001 | David |
| 6,197,428 | B1 | 3/2001 | Rogers |
| 6,203,651 | B1 | 3/2001 | Järvenkylä et al. |
| 6,205,291 | B1 | 3/2001 | Hughes et al. |
| 6,207,625 | B1 | 3/2001 | Ogano et al. |
| 6,227,056 | B1 | 5/2001 | Bills et al. |
| 6,237,441 | B1 | 5/2001 | Nishioka et al. |
| 6,237,852 | B1 | 5/2001 | Svetal et al. |
| 6,238,839 | B1 | 5/2001 | Tomita et al. |
| 6,255,262 | B1 | 7/2001 | Keenan et al. |
| 6,261,424 | B1 | 7/2001 | Goncharenko et al. |
| 6,273,793 | B1 | 8/2001 | Liners et al. |
| 6,274,220 | B1 | 8/2001 | Tsukuda et al. |
| 6,289,593 | B1 | 9/2001 | Decker et al. |
| 6,293,648 | B1 | 9/2001 | Anderson |
| 6,296,552 | B1 | 10/2001 | Boutaghou et al. |
| 6,299,425 | B1 | 10/2001 | Hirano et al. |
| 6,305,416 | B1 | 10/2001 | Snel et al. |
| 6,309,283 | B1 | 10/2001 | Liners et al. |
| 6,311,524 | B1 | 11/2001 | Brennan, III et al. |
| 6,316,734 | B1 | 11/2001 | Yang |
| 6,322,431 | B1 | 11/2001 | Schaenzer et al. |
| 6,322,719 | B2 | 11/2001 | Kaneko et al. |
| 6,324,060 | B1 | 11/2001 | Hsu |
| 6,325,385 | B1 | 12/2001 | Iwashita et al. |
| 6,329,328 | B1 | 12/2001 | Koganei et al. |
| 6,333,298 | B1 | 12/2001 | Waddoups et al. |
| 6,338,881 | B1 | 1/2002 | Sellschopp et al. |
| 6,340,245 | B1 | 1/2002 | Horton et al. |
| 6,358,123 | B1 | 3/2002 | Liners et al. |
| 6,367,705 | B1 | 4/2002 | Lee et al. |
| 6,368,676 | B1 | 4/2002 | Gaudreau et al. |
| 6,377,422 | B1 | 4/2002 | Boutaghou et al. |
| 6,379,383 | B1 | 4/2002 | Palmaz et al. |
| 6,385,987 | B2 | 5/2002 | Schlom et al. |
| 6,386,468 | B1 | 5/2002 | Neuberger et al. |
| 6,399,215 | B1 | 6/2002 | Zhu et al. |
| 6,401,058 | B1 | 6/2002 | Akalin et al. |
| 6,439,845 | B1 | 8/2002 | Veres |
| 6,439,986 | B1 | 8/2002 | Myoung et al. |
| 6,452,752 | B1 | 9/2002 | Boutaghou |
| 6,468,642 | B1 | 10/2002 | Bray et al. |
| 6,471,979 | B2 | 10/2002 | New et al. |
| 6,494,881 | B1 | 12/2002 | Bales et al. |
| 6,523,456 | B1 | 2/2003 | Kobayashi et al. |
| 6,524,212 | B2 | 2/2003 | Ushijima et al. |
| 6,534,141 | B1 | 3/2003 | Hull, Jr. et al. |
| 6,537,310 | B1 | 3/2003 | Palmaz et al. |
| 6,537,429 | B2 | 3/2003 | O'Donnell et al. |
| 6,543,394 | B2 | 4/2003 | Tinney |
| 6,544,308 | B2 | 4/2003 | Griffin et al. |
| 6,553,957 | B1 | 4/2003 | Ishikawa et al. |
| 6,557,968 | B2 | 5/2003 | Lee et al. |
| 6,562,445 | B2 | 5/2003 | Iwamura |
| 6,562,462 | B2 | 5/2003 | Griffin et al. |
| 6,570,172 | B2 | 5/2003 | Kim et al. |
| 6,572,651 | B1 | 6/2003 | DeScheerder et al. |
| 6,572,935 | B1 | 6/2003 | He et al. |
| 6,572,937 | B2 | 6/2003 | Hakovirta et al. |
| 6,585,064 | B2 | 7/2003 | Griffin et al. |
| 6,586,069 | B2 | 7/2003 | Dykes et al. |
| 6,589,640 | B2 | 7/2003 | Griffin et al. |
| 6,592,519 | B1 | 7/2003 | Martinez |
| 6,592,985 | B2 | 7/2003 | Griffin et al. |
| 6,601,662 | B2 | 8/2003 | Matthias et al. |
| 6,626,949 | B1 | 9/2003 | Townley |
| 6,637,528 | B2 | 10/2003 | Nishiyama et al. |
| 6,638,569 | B2 | 10/2003 | McLaughlin et al. |
| 6,645,354 | B1 | 11/2003 | Gorokhovsky |
| 6,656,329 | B1 | 12/2003 | Ma et al. |
| 6,658,941 | B1 | 12/2003 | Bills et al. |
| 6,666,013 | B2 * | 12/2003 | Nakagawa et al. ............... 59/5 |
| 6,666,328 | B2 | 12/2003 | Sykora |
| 6,666,671 | B1 | 12/2003 | Olver et al. |
| 6,684,513 | B1 | 2/2004 | Clipstone et al. |
| 6,684,759 | B1 | 2/2004 | Gorokhovsky |
| 6,695,865 | B2 | 2/2004 | Boyle et al. |
| 6,699,106 | B2 | 3/2004 | Myoung et al. |
| 6,701,627 | B2 | 3/2004 | Korb et al. |
| 6,715,693 | B1 | 4/2004 | Dam et al. |
| 6,726,993 | B2 | 4/2004 | Teer et al. |
| 6,729,350 | B2 | 5/2004 | Schick |
| 6,729,527 | B2 | 5/2004 | Sonnenreich et al. |
| 6,733,513 | B2 | 5/2004 | Boyle et al. |
| 6,739,214 | B2 | 5/2004 | Griffin et al. |
| 6,739,238 | B2 | 5/2004 | Ushijima et al. |
| 6,740,393 | B1 | 5/2004 | Massler et al. |
| 6,745,742 | B2 | 6/2004 | Meyer |
| 6,749,033 | B2 | 6/2004 | Griffin et al. |
| 6,753,042 | B1 | 6/2004 | Bakounine et al. |
| 6,753,635 | B2 | 6/2004 | Kuhlmann-Wilsdorf |
| 6,761,532 | B2 | 7/2004 | Capone et al. |
| 6,761,736 | B1 | 7/2004 | Woo et al. |
| 6,780,177 | B2 | 8/2004 | Shafirstein et al. |
| 6,797,326 | B2 | 9/2004 | Griffin et al. |
| 6,799,468 | B2 | 10/2004 | Borenstein |
| 6,806,242 | B2 * | 10/2004 | Shirahama et al. ............ 508/291 |
| 6,818,029 | B2 | 11/2004 | Myoung et al. |
| 6,820,676 | B2 | 11/2004 | Palmaz et al. |
| 6,821,189 | B1 | 11/2004 | Coad et al. |
| 6,821,624 | B2 | 11/2004 | Utsumi et al. |
| 6,822,788 | B2 | 11/2004 | Blitstein |
| 6,849,085 | B2 | 2/2005 | Marton |
| 6,855,237 | B2 | 2/2005 | Kolpakov et al. |
| 6,855,791 | B2 | 2/2005 | Van Doren et al. |
| 6,861,098 | B2 | 3/2005 | Griffin et al. |
| 6,861,137 | B2 | 3/2005 | Griffin et al. |
| 6,865,952 | B2 | 3/2005 | Bills et al. |
| 6,866,894 | B2 | 3/2005 | Trankiem et al. |
| 6,871,700 | B2 | 3/2005 | Gorokhovsky |
| 6,872,203 | B2 | 3/2005 | Shafirstein et al. |
| 6,878,447 | B2 | 4/2005 | Griffin et al. |
| 6,880,469 | B2 | 4/2005 | Frost |
| 6,882,094 | B2 | 4/2005 | Dimitrijevic et al. |
| 6,883,476 | B1 | 4/2005 | Nohara et al. |
| 6,886,521 | B2 | 5/2005 | Hamada et al. |
| 6,887,585 | B2 | 5/2005 | Herbst-Dederichs |
| 6,890,700 | B2 | 5/2005 | Tomita et al. |
| 6,893,720 | B1 | 5/2005 | Nakahigashi et al. |

| | | |
|---|---|---|
| 6,969,198 B2 | 11/2005 | Konishi et al. |
| 7,063,207 B2 * | 6/2006 | Sykora ................ 198/853 |
| 2001/0036800 A1 | 11/2001 | Liners et al. |
| 2002/0026899 A1 | 3/2002 | McLaughlin et al. |
| 2002/0031987 A1 | 3/2002 | Liners et al. |
| 2002/0034631 A1 | 3/2002 | Griffin et al. |
| 2002/0034632 A1 | 3/2002 | Griffin et al. |
| 2002/0051286 A1 | 5/2002 | Blitstein |
| 2002/0068654 A1 * | 6/2002 | Baumann et al. ........... 474/215 |
| 2002/0070357 A1 | 6/2002 | Kim et al. |
| 2002/0074168 A1 | 6/2002 | Matthias et al. |
| 2002/0089571 A1 | 7/2002 | Lee et al. |
| 2002/0090155 A1 | 7/2002 | Ushijima et al. |
| 2002/0090578 A1 | 7/2002 | Schaefera et al. |
| 2002/0130219 A1 | 9/2002 | Parseghian et al. |
| 2002/0148430 A1 | 10/2002 | Kano et al. |
| 2002/0155015 A1 | 10/2002 | Esumi et al. |
| 2002/0175476 A1 | 11/2002 | Chinou et al. |
| 2002/0187903 A1 * | 12/2002 | Sato et al. ................ 508/192 |
| 2003/0012234 A1 | 1/2003 | Watson et al. |
| 2003/0019111 A1 | 1/2003 | Korb et al. |
| 2003/0019332 A1 | 1/2003 | Korb et al. |
| 2003/0021995 A1 | 1/2003 | Griffin et al. |
| 2003/0034182 A1 | 2/2003 | Griffin et al. |
| 2003/0035957 A1 | 2/2003 | Griffin et al. |
| 2003/0035958 A1 | 2/2003 | Griffin et al. |
| 2003/0036341 A1 | 2/2003 | Myoung et al. |
| 2003/0037640 A1 | 2/2003 | Griffin et al. |
| 2003/0054171 A1 * | 3/2003 | Fukui et al. ............... 428/408 |
| 2003/0069632 A1 | 4/2003 | De Scheerder et al. |
| 2003/0108777 A1 | 6/2003 | Gunsel et al. |
| 2003/0114094 A1 | 6/2003 | Myoung et al. |
| 2003/0128903 A1 | 7/2003 | Yasuda et al. |
| 2003/0159919 A1 | 8/2003 | Fairbairn et al. |
| 2003/0162672 A1 * | 8/2003 | Shirahama et al. .......... 508/291 |
| 2003/0166474 A1 * | 9/2003 | Winemiller et al. ......... 508/192 |
| 2003/0168323 A1 | 9/2003 | Frost |
| 2003/0177752 A1 * | 9/2003 | Nakagawa et al. .............. 59/5 |
| 2003/0180565 A1 | 9/2003 | Herbst-Dederichs |
| 2003/0195074 A1 * | 10/2003 | Kaga et al. ................ 474/213 |
| 2003/0199741 A1 | 10/2003 | Martinez |
| 2003/0234371 A1 | 12/2003 | Ziegler |
| 2003/0235691 A1 | 12/2003 | Griffin et al. |
| 2004/0003638 A1 | 1/2004 | Schaefer et al. |
| 2004/0008406 A1 | 1/2004 | Blitstein |
| 2004/0010068 A1 | 1/2004 | Doren et al. |
| 2004/0011900 A1 | 1/2004 | Gebhardt et al. |
| 2004/0027018 A1 | 2/2004 | LeBlanc et al. |
| 2004/0035375 A1 | 2/2004 | Gibisch et al. |
| 2004/0074467 A1 | 4/2004 | Hamada et al. |
| 2004/0092405 A1 | 5/2004 | Konishi et al. |
| 2004/0105806 A1 | 6/2004 | Griffin et al. |
| 2004/0109621 A1 | 6/2004 | Frost |
| 2004/0115435 A1 | 6/2004 | Griffin et al. |
| 2004/0133301 A1 | 7/2004 | Van Doren et al. |
| 2004/0154570 A1 | 8/2004 | Mabuchi et al. |
| 2004/0168326 A1 | 9/2004 | Korb et al. |
| 2004/0184687 A1 | 9/2004 | Morales et al. |
| 2004/0223256 A1 | 11/2004 | Feng et al. |
| 2004/0241448 A1 | 12/2004 | Kano et al. |
| 2004/0242435 A1 | 12/2004 | Nishimura et al. |
| 2004/0244539 A1 | 12/2004 | Korb et al. |
| 2004/0261614 A1 | 12/2004 | Hamada et al. |
| 2005/0001201 A1 | 1/2005 | Bocko et al. |
| 2005/0005892 A1 | 1/2005 | Nishimura et al. |
| 2005/0025975 A1 | 2/2005 | Okamoto et al. |
| 2005/0035222 A1 | 2/2005 | Hamada et al. |
| 2005/0056241 A1 | 3/2005 | Nomura et al. |
| 2005/0061291 A1 | 3/2005 | Nishimura et al. |
| 2005/0061636 A1 | 3/2005 | Frost et al. |
| 2005/0064196 A1 | 3/2005 | Martin et al. |
| 2005/0082139 A1 | 4/2005 | Ishikawa et al. |
| 2005/0084390 A1 | 4/2005 | Ueno et al. |
| 2005/0089685 A1 | 4/2005 | Hamada et al. |
| 2005/0100701 A1 | 5/2005 | Hamada et al. |
| 2005/0115744 A1 | 6/2005 | Griffin et al. |
| 2005/0188942 A1 | 9/2005 | Hamada et al. |

FOREIGN PATENT DOCUMENTS

| | | |
|---|---|---|
| DE | 643 034 | 3/1937 |
| DE | 19507086 A1 | 9/1996 |
| DE | 19507086 C2 | 9/1996 |
| DE | 197 04 224 | 8/1997 |
| DE | 198 15 989 | 10/1999 |
| DE | 198 25 860 | 12/1999 |
| DE | 19825860 A1 | 12/1999 |
| DE | 100 17 459 | 10/2000 |
| DE | 100 61 397 A1 | 5/2002 |
| DE | 101 58 683 | 6/2003 |
| DE | 103 18 135 | 11/2003 |
| DE | 10337559 A1 | 3/2005 |
| EP | 0 286 996 | 10/1988 |
| EP | 0 291 006 A2 | 11/1988 |
| EP | 0 299 785 | 1/1989 |
| EP | 0308143 B1 | 3/1989 |
| EP | 0 333 416 | 9/1989 |
| EP | 0378378 B1 | 7/1990 |
| EP | 0384772 A1 | 8/1990 |
| EP | 0388800 A2 | 9/1990 |
| EP | 0392125 A1 | 10/1990 |
| EP | 0398985 B1 | 11/1990 |
| EP | 407977 | 1/1991 |
| EP | 0 435 312 | 7/1991 |
| EP | 0474369 A1 | 3/1992 |
| EP | 0 500 253 | 8/1992 |
| EP | 0511153 A1 | 10/1992 |
| EP | 0 529 327 | 3/1993 |
| EP | 0392125 B1 | 3/1993 |
| EP | 0546824 A1 | 6/1993 |
| EP | 0308143 A1 | 11/1993 |
| EP | 0573943 A1 | 12/1993 |
| EP | 0619504 A1 | 10/1994 |
| EP | 0621136 A2 | 10/1994 |
| EP | 0624353 A3 | 11/1994 |
| EP | 0624354 A3 | 11/1994 |
| EP | 0378378 B1 | 1/1995 |
| EP | 0651069 A1 | 5/1995 |
| EP | 0652301 A1 | 5/1995 |
| EP | 0656458 A3 | 6/1995 |
| EP | 0 661 470 | 7/1995 |
| EP | 0396603 B1 | 6/1996 |
| EP | 0388800 B1 | 12/1996 |
| EP | 0 759 519 | 2/1997 |
| EP | 0474369 B1 | 3/1997 |
| EP | 0 818 622 | 1/1998 |
| EP | 0652301 B1 | 1/1998 |
| EP | 0826790 A1 | 3/1998 |
| EP | 0842754 A1 | 5/1998 |
| EP | 0 870 820 | 10/1998 |
| EP | 0816112 A3 | 10/1998 |
| EP | 0882759 A1 | 12/1998 |
| EP | 884400 A1 * | 12/1998 |
| EP | 0893677 B1 | 1/1999 |
| EP | 0624353 B1 | 2/1999 |
| EP | 0656458 B1 | 2/1999 |
| EP | 0 905 221 A1 | 3/1999 |
| EP | 0 905 419 | 3/1999 |
| EP | 0647318 B1 | 3/1999 |
| EP | 0651069 B1 | 3/1999 |
| EP | 0 731 190 B1 | 5/1999 |
| EP | 0949200 A1 | 10/1999 |
| EP | 0845154 B1 | 11/1999 |
| EP | 0624354 B1 | 12/1999 |
| EP | 0582676 B1 | 3/2000 |
| EP | 1063085 A1 | 12/2000 |

| | | | | | | |
|---|---|---|---|---|---|---|
| EP | 1 067 211 | 1/2001 | | JP | 11-294118 | 10/1999 |
| EP | 0850126 B1 | 1/2001 | | JP | 11-333773 A2 | 12/1999 |
| EP | 1076087 | 2/2001 | | JP | 2000-88104 | 3/2000 |
| EP | 1078736 A1 | 2/2001 | | JP | 2000087218 A * | 3/2000 |
| EP | 1109196 A1 | 6/2001 | | JP | 2000-119843 | 4/2000 |
| EP | 0778902 B1 | 9/2001 | | JP | 2000-504089 | 4/2000 |
| EP | 1 154 012 | 11/2001 | | JP | 2000-128516 A | 5/2000 |
| EP | 0826790 B1 | 11/2001 | | JP | 2000-297373 | 10/2000 |
| EP | 1034320 B1 | 12/2001 | | JP | 2000-327484 | 11/2000 |
| EP | 0850133 B1 | 1/2002 | | JP | 2000-339083 | 12/2000 |
| EP | 0893677 B1 | 1/2002 | | JP | 2001-64005 A | 3/2001 |
| EP | 1184480 A2 | 3/2002 | | JP | 2001-93141 A2 | 4/2001 |
| EP | 1190791 A3 | 4/2002 | | JP | 2001-172766 A2 | 6/2001 |
| EP | 1219464 A2 | 7/2002 | | JP | 2001-192864 | 7/2001 |
| EP | 1 233 054 A1 | 8/2002 | | JP | 2001-269938 | 10/2001 |
| EP | 0971812 B1 | 10/2002 | | JP | 2001-280236 | 10/2001 |
| EP | 1018291 B1 | 10/2002 | | JP | 2001-316686 A | 11/2001 |
| EP | 1281513 A2 | 2/2003 | | JP | 2002-31040 A | 1/2002 |
| EP | 1 300 608 A2 | 4/2003 | | JP | 2002-265968 A2 | 9/2002 |
| EP | 0950123 B1 | 5/2003 | | JP | 2002-309912 | 10/2002 |
| EP | 0882759 B1 | 6/2003 | | JP | 2002-332571 | 11/2002 |
| EP | 1 338 641 | 8/2003 | | JP | 2003-13163 | 1/2003 |
| EP | 1340605 A1 | 9/2003 | | JP | 2003-13799 | 1/2003 |
| EP | 1365141 A1 | 11/2003 | | JP | 2003-25117 | 1/2003 |
| EP | 1083946 B1 | 12/2003 | | JP | 2003-027081 A | 1/2003 |
| EP | 1078736 B1 | 1/2004 | | JP | 2003-28174 A2 | 1/2003 |
| EP | 1378271 A1 | 1/2004 | | JP | 2003-88939 | 3/2003 |
| EP | 0757615 B1 | 3/2004 | | JP | 2003-113941 | 4/2003 |
| EP | 0842754 B1 | 3/2004 | | JP | 2003-147508 | 5/2003 |
| EP | 1 411 145 | 4/2004 | | JP | 2004-36788 A2 | 2/2004 |
| EP | 0862395 B1 | 4/2004 | | JP | 2005-68529 A2 | 3/2005 |
| EP | 1 418 353 A2 | 5/2004 | | RU | 1770350 A1 | 10/1992 |
| EP | 1440775 A1 | 7/2004 | | RU | 2004586 C1 | 12/1993 |
| EP | 1445119 A1 | 8/2004 | | RU | 2153782 C1 | 7/2000 |
| EP | 1475557 A1 | 11/2004 | | WO | WO 89/06707 A1 | 7/1989 |
| EP | 1481699 A1 | 12/2004 | | WO | WO 89/06708 A1 | 7/1989 |
| EP | 1482190 A2 | 12/2004 | | WO | WO 8906338 A1 | 7/1989 |
| EP | 1498597 A1 | 1/2005 | | WO | WO 92/02602 | 2/1992 |
| EP | 1 510 594 A2 | 3/2005 | | WO | WO 9206843 A1 | 4/1992 |
| EP | 1311885 B1 | 3/2005 | | WO | WO 9219425 A2 | 11/1992 |
| EP | 1512781 A2 | 3/2005 | | WO | WO 93/21288 | 10/1993 |
| EP | 1183470 B1 | 4/2005 | | WO | WO 93/21289 | 10/1993 |
| FR | 2 669 689 | 5/1992 | | WO | WO 9324828 A1 | 12/1993 |
| GB | 768226 | 2/1957 | | WO | WO 95/20253 A2 | 7/1995 |
| GB | 1005638 | 10/1988 | | WO | WO 95/29044 A1 | 11/1995 |
| GB | 2338716 | 12/1999 | | WO | WO 95/29273 A1 | 11/1995 |
| IE | 0990532 A1 | 3/2001 | | WO | WO 95/31584 A1 | 11/1995 |
| JP | 62-111106 | 5/1987 | | WO | WO 96/04485 | 2/1996 |
| JP | 63-21209 A2 | 1/1988 | | WO | WO 96/05333 A1 | 2/1996 |
| JP | 63-288994 A2 | 11/1988 | | WO | WO 96/05942 A1 | 2/1996 |
| JP | 5-70879 | 3/1993 | | WO | WO 96/06961 A1 | 3/1996 |
| JP | 5-36004 | 5/1993 | | WO | WO 96/12389 A1 | 4/1996 |
| JP | 5-42616 | 6/1993 | | WO | WO 96/24488 A1 | 8/1996 |
| JP | 6-264993 A | 9/1994 | | WO | WO 96/40446 A1 | 12/1996 |
| JP | 6-294307 A | 10/1994 | | WO | WO 97/07531 A1 | 2/1997 |
| JP | 7-63135 | 3/1995 | | WO | WO 97/10093 A1 | 3/1997 |
| JP | 7-90553 A | 4/1995 | | WO | WO 97/10940 A1 | 3/1997 |
| JP | 7-103238 | 4/1995 | | WO | WO 97/14555 A1 | 4/1997 |
| JP | 07-118832 | 5/1995 | | WO | WO 97/16138 A1 | 5/1997 |
| JP | 7-41386 A2 | 10/1995 | | WO | WO 98/02715 A1 | 1/1998 |
| JP | 7-286696 | 10/1995 | | WO | WO 98/12994 A1 | 4/1998 |
| JP | 8-14014 | 1/1996 | | WO | WO 98/13528 A1 | 4/1998 |
| JP | 8-61499 | 3/1996 | | WO | WO 98/47141 A1 | 10/1998 |
| JP | 9-20981 A2 | 1/1997 | | WO | WO 99/09547 A1 | 2/1999 |
| JP | 52006318 | 1/1997 | | WO | WO 99/12404 A1 | 3/1999 |
| JP | 253770 A2 | 9/1997 | | WO | WO 99/14512 A1 | 3/1999 |
| JP | 10025565 A * | 1/1998 | | WO | WO 99/16371 A1 | 4/1999 |
| JP | 10-088369 A2 | 4/1998 | | WO | WO 99/22694 A2 | 5/1999 |
| JP | 10-265790 | 10/1998 | | WO | WO 99/27157 A1 | 6/1999 |
| JP | 10-298440 A2 | 11/1998 | | WO | WO 99/29477 A1 | 6/1999 |
| JP | 11-22423 | 1/1999 | | WO | WO 99/31557 A1 | 6/1999 |
| JP | 11-190406 A | 7/1999 | | WO | WO 99/34385 A1 | 7/1999 |
| JP | 11-292629 A2 | 10/1999 | | WO | WO 99/46847 A1 | 9/1999 |

| | | | | | | |
|---|---|---|---|---|---|---|
| WO | WO 99/54520 A1 | 10/1999 | | WO | WO 2004/048126 A2 | 6/2004 |
| WO | WO 99/54934 A1 | 10/1999 | | WO | WO 2004/067466 A1 | 8/2004 |
| WO | WO 99/57743 A1 | 11/1999 | | WO | WO 2004/068530 A1 | 8/2004 |
| WO | WO 99/62077 A1 | 12/1999 | | WO | WO 2004/071670 A1 | 8/2004 |
| WO | WO 99/62572 A1 | 12/1999 | | WO | WO 2004/072959 A2 | 8/2004 |
| WO | WO 00/22613 A1 | 4/2000 | | WO | WO 2004/078424 A2 | 9/2004 |
| WO | WO 00/24554 A1 | 5/2000 | | WO | WO 2004/084773 A1 | 10/2004 |
| WO | WO 00/25410 A1 | 5/2000 | | WO | WO 2004/088113 A1 | 10/2004 |
| WO | WO 00/28142 A1 | 5/2000 | | WO | WO 2005/010596 A2 | 2/2005 |
| WO | WO 00/33051 A1 | 6/2000 | | WO | WO 2005/011744 A2 | 2/2005 |
| WO | WO 00/35000 A1 | 6/2000 | | WO | WO 2005/014760 A1 | 2/2005 |
| WO | WO 00/44032 A1 | 7/2000 | | WO | WO 2005/014882 A1 | 2/2005 |
| WO | WO 00/47402 A1 | 8/2000 | | WO | WO 2005/016620 A2 | 2/2005 |
| WO | WO 00/55385 A1 | 9/2000 | | WO | WO 2005/021851 A1 | 3/2005 |
| WO | WO 00/56127 A1 | 9/2000 | | WO | WO 2005/025844 A1 | 3/2005 |
| WO | WO 00/56393 A1 | 9/2000 | | WO | WO 2005/034791 A1 | 4/2005 |
| WO | WO 00/62327 A2 | 10/2000 | | WO | WO 2005/037144 A2 | 4/2005 |
| WO | WO 00/68451 A2 | 11/2000 | | WO | WO 2005/037985 A2 | 4/2005 |
| WO | WO 00/75517 A1 | 12/2000 | | WO | WO 2005/040451 A1 | 5/2005 |
| WO | WO 00/78504 A1 | 12/2000 | | WO | WO 2005/042064 A1 | 5/2005 |
| WO | WO 01/05917 | 1/2001 | | WO | WO 2005/047737 A1 | 5/2005 |
| WO | WO 01/06033 A1 | 2/2001 | | | | |
| WO | WO 01/14736 A1 | 3/2001 | | | | |
| WO | WO 01/14745 A1 | 3/2001 | | | | |
| WO | WO 01/26862 A1 | 4/2001 | | | | |
| WO | WO 01/37631 A2 | 5/2001 | | | | |
| WO | WO 01/40537 A1 | 6/2001 | | | | |
| WO | WO 01/47451 A1 | 7/2001 | | | | |
| WO | WO 01/59544 A2 | 8/2001 | | | | |
| WO | WO 01/61182 | 8/2001 | | | | |
| WO | WO 01/61719 A1 | 8/2001 | | | | |
| WO | WO 01/62372 A1 | 8/2001 | | | | |
| WO | WO 01/63639 A1 | 8/2001 | | | | |
| WO | WO 01/67834 A1 | 9/2001 | | | | |
| WO | WO 01/79583 A2 | 10/2001 | | | | |
| WO | WO 01/80224 A2 | 10/2001 | | | | |
| WO | WO 02/06875 A1 | 1/2002 | | | | |
| WO | WO 02/13188 A1 | 2/2002 | | | | |
| WO | WO 02/24601 A1 | 3/2002 | | | | |
| WO | WO 02/24603 A1 | 3/2002 | | | | |
| WO | WO 02/24970 A2 | 3/2002 | | | | |
| WO | WO 02/32625 A2 | 4/2002 | | | | |
| WO | WO 02/44440 A1 | 6/2002 | | | | |
| WO | WO 02/46831 A1 | 6/2002 | | | | |
| WO | WO 02/054454 A2 | 7/2002 | | | | |
| WO | WO 02/062714 A2 | 8/2002 | | | | |
| WO | WO 02/073021 | 9/2002 | | | | |
| WO | WO 02/080996 A1 | 10/2002 | | | | |
| WO | WO 02/085237 A2 | 10/2002 | | | | |
| WO | WO 02/090461 A1 | 11/2002 | | | | |
| WO | WO 02/097289 A1 | 12/2002 | | | | |
| WO | WO 03/009978 A1 | 2/2003 | | | | |
| WO | WO 03/013990 A1 | 2/2003 | | | | |
| WO | WO 03/020329 A1 | 3/2003 | | | | |
| WO | WO 03/021731 A1 | 3/2003 | | | | |
| WO | WO 03/031543 A2 | 4/2003 | | | | |
| WO | WO 03/046508 A3 | 6/2003 | | | | |
| WO | WO 03/054876 A1 | 7/2003 | | | | |
| WO | WO 03/076309 A2 | 9/2003 | | | | |
| WO | WO 03/078679 A1 | 9/2003 | | | | |
| WO | WO 03/091758 A2 | 11/2003 | | | | |
| WO | WO 03/095009 A1 | 11/2003 | | | | |
| WO | WO 03/105134 A1 | 12/2003 | | | | |
| WO | WO 2004/001804 A2 | 12/2003 | | | | |
| WO | WO 2004/004998 A1 | 1/2004 | | | | |
| WO | WO 2004/019809 A2 | 3/2004 | | | | |
| WO | WO 2004/024206 A1 | 3/2004 | | | | |
| WO | WO 2004/026359 A1 | 4/2004 | | | | |
| WO | WO 2004/026500 A2 | 4/2004 | | | | |
| WO | WO 2004/036169 A1 | 4/2004 | | | | |
| WO | WO 2004/036292 A2 | 4/2004 | | | | |
| WO | WO 2004/038701 A2 | 5/2004 | | | | |
| WO | WO 2004/043631 A1 | 5/2004 | | | | |

OTHER PUBLICATIONS

U.S. Appl. No. 10/914,505, filed Aug. 10, 2004, Nishimura et al.
U.S. Appl. No. 10/468,713, filed Aug. 22, 2003, Mabuchi et al.
"Geometrical Product Specifications (GPS)—Surface texture: Profile method—Terms, definitions and surface texture parameters", Japanese Industrial Standard (JIS B 0601) Machine Elements, 2003, pp. 263-287.
"Petroleum products—Determination of base number—Perchloric acid potentiometric titration method", International Organization of Standardization (ISO 3771), Aug. 15, 1994, pp. 1-8.
"Standard Test Method for Separation of Representative Aromatics and Nonaromatics Fractions of High-Boiling Oils by Elution Chromatography", American Society for Testing and Materials (ASTM D 2549), 1995, pp. 895-900.
Von Dr.-Ing et al., "Neuartige Laufflächen-Schutzverfahren für Kolben von Verbrennungsmotoren", VDI-Zeitschrift Bd., Apr. 18, 1942, pp. 245-247, vol 86, No. 15-16.
Gåhlin, Rickard et al., "ME-C:H Coatings in Motor Vehicles," *Wear* 249, 2001, pp. 302-309.
Hershberger, J., et al., "Evaluation of DLC Coatings for Spark-Ignited, Direct-Injected Fuel Systems," *Surface & Coatings Technology*, 179, 2004, pp. 237-244.
Hershberger, J, et al., "Friction and Wear Behavior of Near-Frictionless Carbon Coatings in Formulated Gasolines," *Surface & Coating Technology*, 183, 2004, pp. 111-117.
Kovalchenko, A., et al., "Friction and Wear Performance of Low-Friction Carbon Coatings Under Oil Lubrication," Energy Technology Div., Argonne National Laboratory.
Ajayi, O., et al., "Effect of Carbon Coating on Scuffing Performance in Diesel Fuels," *Tribology Transactions*, vol. 44, 2001, pp. 298-304.
Ajayi, O., et al., Effect of Thin-Film Coating on Wear in EGR-Contaminated Oil, Energy Technology Div., Argonne National Laboratory.
Fujimori, N., et al., "Characterization of Conducting Diamond Films," *Vacuum*, vol. 36, Nos. 1-3, 1996, pp. 99-102.
Patent/Literature Search Report, Bawa Biotechnology Consulting, LLC, Jun. 3, 2005 (201 pages).
"Aluminium Alloy Die Castings," Japanese Industrial Standard (JIS H 5302), 2000, pp. 1-12.
"Aluminium Alloys Castings", Japanese Industrial Standard (JIS H 5202), 1999 (18 pages).
Japanese Industrial Standard, "Aluminium Alloy Castings", JIS H 5202, 1999, pp. 1910, 1911 and 1636-1647.
"Aluminum Alloy Die Castings," JIS H5302 (2000), pp. 1670-1681.
"Assessment of 2nd to 5th Order Irregularities of Surface Configuration by Means of Sections of Surfaces Definitions Relating to Reference System and Dimensions," DIN 4762, UDC 621-288:001.4 (Aug. 1960), pp. 1-4.
API Motor Oil Guide, Which Oil is Right for You, American Petroleum Institute, Copyright 2002.

"Carbon Steels for Machine Structural Use", Japanese Industrial Standard (JIS G 4051), 1979, pp. 1381-1383.

"Carbon Steels for Machine Structural Use", Japanese Industrial Standard (JIS G 4051), 1979, pp. 1-10.

"Chromium Molybdenum Steels," Japanese Industrial Standard (JIS G 4105), 1979, pp. 1-11 (with Translation).

"Chromium Steels," Japenese Industrial Standard (JIS G 4104), 1979, pp. 1-9.

D.G. Watson et al., "Engineering Drawing Practice," XP002281300, University of Hertfordshire, Sep. 1991, p. 29, Figure 38.

Database WPI, Nov. 28, 2000, Derwent Publications, Ltd., AN 2000640583, XP002240184, JP 2000-327484, Nov. 28, 2000.

Dr. Marx, "Surfaces and Contact Mechanics", XP-002233233, Google, Retrieved from the Internet, Mar. 3, 2003, pp. 1-18.

Engine Oil Viscosity Classification—SAE J300 revised Apr. 1997, p. 133.

"Geometrical Product Specifications (GPS)—Surface Texture: Profile Method—Terms, Definitions and Surface Texture Parameters," International Standard, ISO 4287, TC 213 (1997), pp. 1-25.

"Grey iron castings", Japanese Industrial Standard (JIS G 5501), pp. 2075-2077.

Japanese Industrial Standard, "High Carbon Chromium Bearing Steels", JIS G 4805, 1999, pp. 1-31 (with translation).

International Standard "Application of Carbides for Machining by Chip Removal—Designation of the Main Groups of Chip Removal and Groups of Application," ISO 513, (1975), pp. 67-69.

Japanese Industrial Standard, "Structural Steels with Specified Hardenability Bands", JIS G 4052, 1979, pp. 2414, 2415, 1390-1403, 1410 and 1411.

JIS Japanese Industrial Standard; "Surface Roughness—Definitions and Designation"; JIS B 0601; 1994. (w/Translation).

JIS Japanese Industrial Standard; "Vickers Hardness Test—Test Method"; JIS Z 2244; 1998; (w/Translation).

Japanese Industrial Standard, 2001, No. B 0601.

K. Holmberg et al., "Tribological Characteristics of Diamond-like Carbon Coatings," VTT Symposium, Technical Research Centre of Finland, XP000570636, 1994, pp. 24-238.

Kano et al., "Friction Characteristics of a Hard Carbon Film in Engine Oil, (No. 2) (Surface Analysis Result of Sliding Surface)," Japan Tribology Congress 1999, 5, pp. 11-12.

M. Kano et al., "The Effect of ZDDP and MODTC Additives on Friction Properties of DLC and Steel Cam Follower in Engine Oil", Abstracts of Papers from 2nd World Tribology Congress, Sep. 3-7, 2001, p. 342.

Patent Abstracts of Japan, vol. 1996, No. 09, Sep. 30, 1996, JP 08-128448, May 21, 1996.

Patent Abstracts of Japan, vol. 2000, No. 01, Jan. 31, 2000, JP 11-287329, Oct. 19, 1999.

Patent Abstracts of Japan, vol. 2000, No. 09, Oct. 13, 2000, JP 2000-170768, Jun. 20, 2000.

PCT/IB2004/002552.

"Stainless Steel Bars", Japanese Industrial Standard (JIS G 4303), pp. 1457-1477.

"Standard Practice for Codification of Certain Nonferrous Metals and Alloys, Cast and Wrought1", ASTM International, Designation: B 275-02, Jun. 2002, pp. 1-7.

"Standard Test Method for Calibration and Operation of the Falex Block-on-Ring Friction and Wear Testing Machine", ASTM Designation: D2714-88, Jan. 1989, pp. 383-386.

Steve J. Bull et al., "High-Performance Diamond and Diamond-like Coatings", JOM, Apr. 1995, pp. 16-19, vol. 47, No. 4, XP 000500980.

Patent Abstracts of Japan, vol. 2003, No. 12, Dec. 5, 2003, JP 2004-155891, Jun. 3, 2004.

U.S. Appl. No. 10/911,741, filed May 5, 2004, Ueno.

Ronkainen, Helena, "Tribological Properties of Hydrogenated and Hydrogen-Free Diamond-Like Carbon Coatings," Disseration for the Degree of Doctor of Science in Technology, VTT Publications No. 434.

* cited by examiner

CHAIN DRIVE SYSTEM

CROSS-REFERENCE TO RELATED APPLICATIONS

The present application is related to the following applications: U.S. patent application Ser. No. 09/545,181 (based on Japanese Patent Application Hei-11-102205 filed on Apr. 9, 1999), now U.S. Pat. No. 6,844,068; U.S. patent application Ser. No. 10/468,713, which is the national phase of PCT Application No. JP02/10057 (based on Japanese Patent Application 2001-117680 filed on Apr. 17, 2001); U.S. patent application Ser. No. 10/355,099 (based on Japanese Patent Application 2002-45576 filed on Feb. 22, 2002) now U.S. Pat. No. 6,806,242; U.S. patent application Ser. No. 10/682,559 (based on Japanese Patent Application No. 2002-302205 filed on Oct. 16, 2002), now U.S. Pat. No. 6,886,521; and U.S. patent application Ser. No. 10/692,853 (based on Japanese Patent Application 2002-322322 filed on Oct. 16, 2002), now U.S. Pat. No. 6,969,198.

BACKGROUND OF THE INVENTION

The invention relates to a chain drive system having parts sliding on each other with less friction resistance and wear so as to increase in durability, prevent secular deteriorations in system performance and obtain, when used to transmit the rotation of a crankshaft to a valve driving camshaft in an internal combustion engine, improvements in engine performance and fuel efficiency.

Japanese Laid-Open Patent Publication No. 6-264993 discloses one type of chain drive system to transmit the rotation of a crankshaft to a pair of valve driving camshafts in an internal combustion engine, which includes a crankshaft sprocket connected to the crankshaft, camshaft sprockets connected to the respective camshafts, a chain looped over the crankshaft sprocket and the camshaft sprockets, a chain guide that guides the chain in a proper chain drive direction and a chain tensioner unit that controls a tension in the chain hydraulically. In the above type of chain drive system, either a roller chain or a silent chain is usable, as proposed in Japanese Laid-Open Patent Publication No. 11-190406.

SUMMARY OF THE INVENTION

The chain generally includes a plurality of chain plates coupled together by pins. Due to the sliding friction between the pin and the chain plate and between any two adjacent chain plates, however, there arise various problems such as energy loss, noise, wear and chain elongation. In addition, the performance deteriorations (such as control timing delay) of the chain drive system may be caused by the chain elongation.

Further, the chain tensioner unit includes a slack guide, a tensioner body and a plunger slidably engaged in the tensioner body to press the slack guide against the chain, so as to control the movement of the chain, apply an initial tension to the chain and thereby prevent the chain from flapping at an engine start. Although it is desirable to minimize a clearance between the tensioner body and the plunger in order to avoid oil leakage during an engine stop and to facilitate the application of an initial tension to the chain, the sliding friction between the tensioner body and the plunger increases with decrease in the clearance between the tensioner body and the plunger. When the sliding friction between the tensioner body and the plunger is increased, the tensioner body and the plunger become subjected to severe wear so that there arises a higher possibility of oil leakage. Also, the tensioner's response to the input from the chain becomes deteriorated. It follows that the chain tensioner unit cannot control the chain movement properly, thereby resulting in chain flapping.

There arise still other problems, such energy loss, noise and wear caused by the sliding friction between the chain and the sprocket and between the chain and the chain guide, strength reduction and early part replacement.

It is therefore an object of the present invention to provide a chain drive system having opposite parts sliding on each other with less friction resistance and wear so as to prevent energy loss and noise and to increase in durability for improvements in the operation performance and efficiency of any instrument, such as an internal combustion engine, equipped with the chain drive system.

As a result of extensive researches, it has been found by the present inventors that a pair of opposite sliding parts shows considerably improved low-friction characteristic and durability in the presence of a specific lubricating oil when either or both of the sliding parts are covered with thin coating films of hard carbon. The present invention is based on the above finding.

According to a first aspect of the present invention, there is provided a chain drive system, comprising: a drive sprocket; a driven sprocket; a chain looped over the drive sprocket and the driven sprocket; the chain and the sprocket having respective sliding surfaces slidable relative to each other in the presence of lubricating oil; any adjacent chain components of the chain having respective sliding surfaces slidable relative to each other in the presence of lubricating oil; at least one of the sliding surfaces between the chain and the sprocket and at least one of the sliding surfaces between any adjacent chain components having hard carbon coatings formed on base portions thereof; and each of the hard carbon coatings having a hydrogen content of 10 atomic % or less.

According to a second aspect of the present invention, there is provided a chain drive system, comprising: a drive sprocket; a driven sprocket; a chain looped over the drive sprocket and the driven sprocket; the chain and the sprocket having respective sliding surfaces slidable relative to each other; any adjacent chain components of the chain having respective sliding surfaces slidable relative to each other; at least one of the sliding surfaces between the chain and the sprocket and at least one of the sliding surfaces between any adjacent chain components having hard carbon coatings formed on base portions thereof; each of the hard carbon coatings having a hydrogen content of 10 atomic % or less; and a lubricant being supplied to lubricate the sliding surfaces between the chain and the sprocket and the sliding surfaces between any adjacent chain components.

The other objects and features of the invention will also become understood from the following description.

DESCRIPTION OF THE EMBODIMENTS

The present invention will be described below in detail. In the following description, all percentages (%) are by mass unless otherwise specified.

Figure 1:
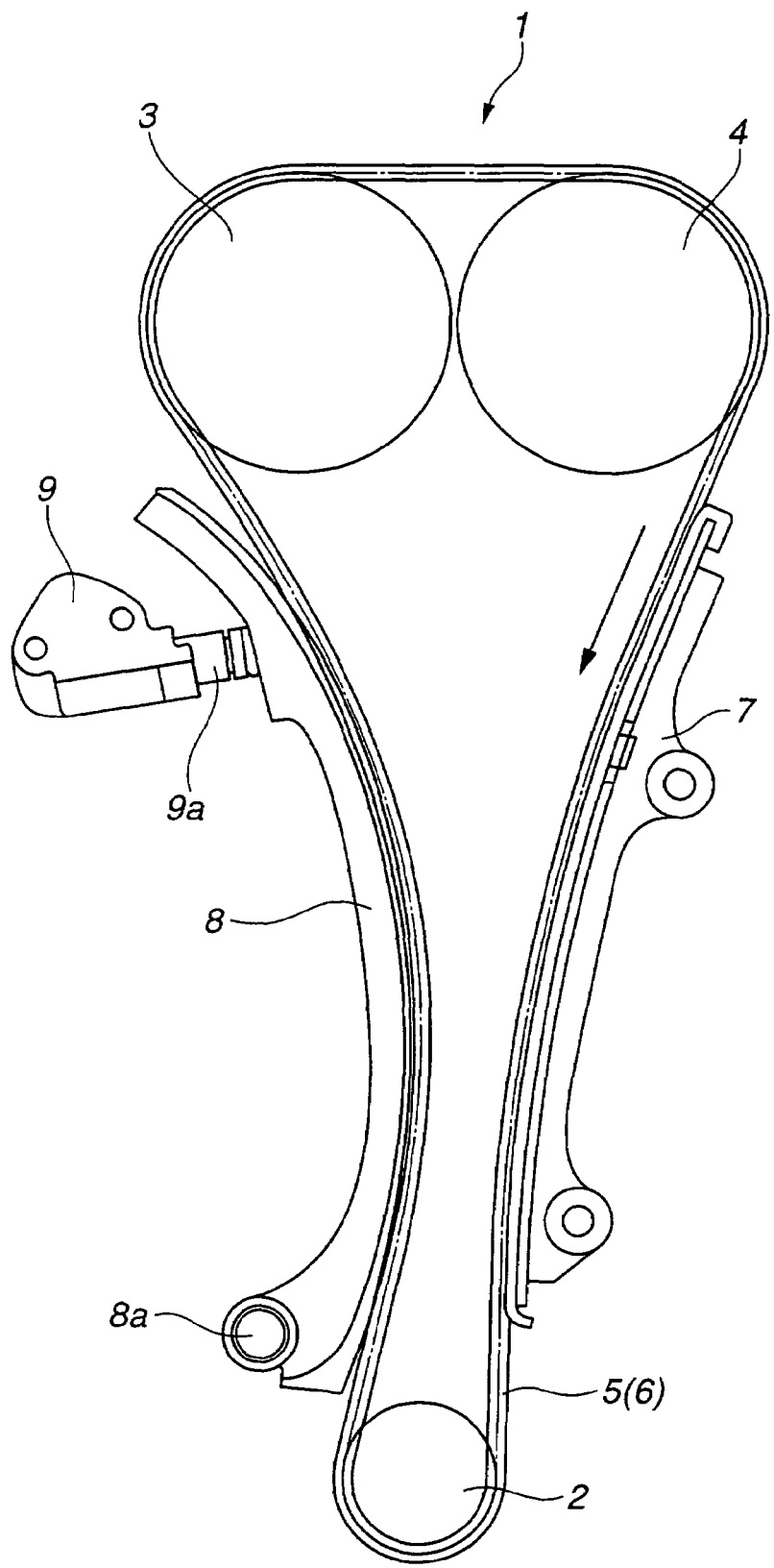
FIG. 1 is a schematic view of a chain drive system according to one embodiment of the present invention.

As shown in FIG. 1, chain drive system 1 according to one exemplary embodiment of the present invention includes first sprocket 2 (as a drive sprocket), a pair of second and third sprockets 3 and 4 (as driven sprockets) and silent chain 5 or roller chain 6. Chain 5 or 6 is formed with chain components and looped over first and second sprockets 2, 3 and 4 so as to move in a chain driving direction (as indicated by an arrow in FIG. 1). Chain drive system 1 further includes chain guide 7 and a chain tensioner unit provided with slack guide 8 and tensioner 9 to control a tension applied to chain 5 or 6, as shown in FIG. 1. Chain guide 7 is disposed between first and third sprockets 2 and 4 to guide the movement of chain 5 or 6 in the chain driving direction properly. Slack guide 8 is disposed between first and second sprockets 2 and 3 and supported pivotally by pivot shaft 8a. Tensioner 9 has plunger 9a slidably engaged in the tensioner body so that plunger 9a projects to press slack guide 8 against chain 5 or 6. These system parts 2, 3, 4, 5 or 6, 7, 8 and 9 are lubricated with a lubricating oil so as to reduce the sliding friction therebetween.

In the present embodiment, at least one of the sliding surfaces between sprocket 2, 3, 4 and chain 5, 6, at least one of the sliding surfaces between any two opposite chain components of chain 5, 6, at least one of the sliding surfaces between chain 5, 6 and guide 7, 8, at least one of the sliding surfaces between slack guide 8 and pivot shaft 8a and at least one of the sliding surfaces between plunger 9a and the tensioner body have thin coatings of hard carbon Fc.

Figure 2A:
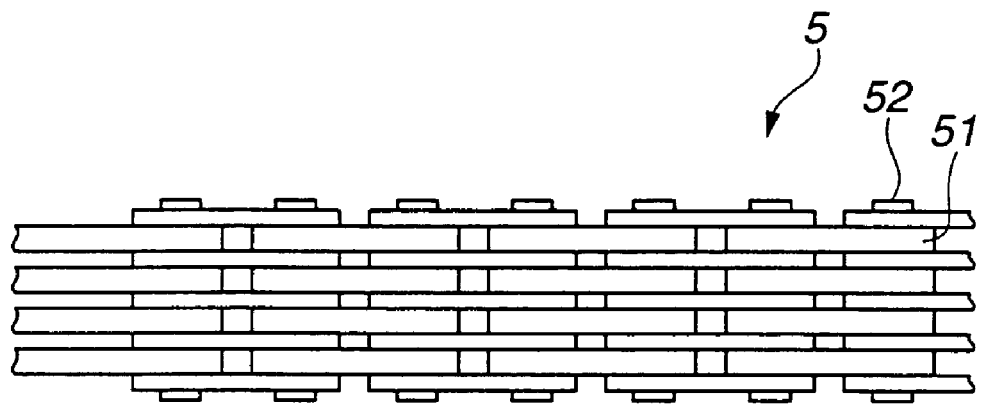
FIG. 2A is a plan view of a silent chain usable in the chain drive system of FIG. 1.
Figure 2B:
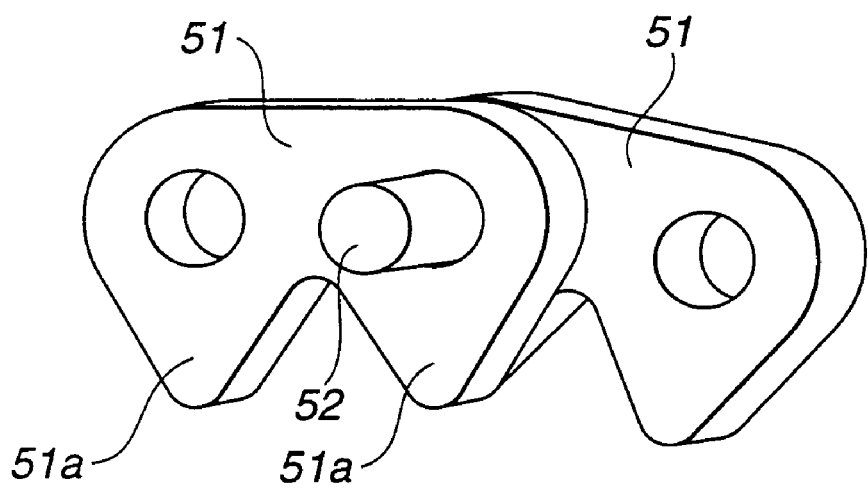
FIG. 2B is an enlarged perspective view of chain components of the silent chain of FIG. 2A.

More specifically, silent chain 5 has a plurality of chain plates 51 coupled together by pins 52 as shown in FIGS. 2A and 2B. (In this case, chain plates 51 and pins 52 act as the chain components.) Each chain plate 51 has two gear teeth 51a arranged at the inner radius side of chain 5, i.e., at the side of chain plate 51 facing sprockets 2, 3 and 4. Pin hole 51b is formed in chain plate 51, and pin 52 is engaged in pin hole 51b to couple one chain plate 51 to another.

Figure 4A:
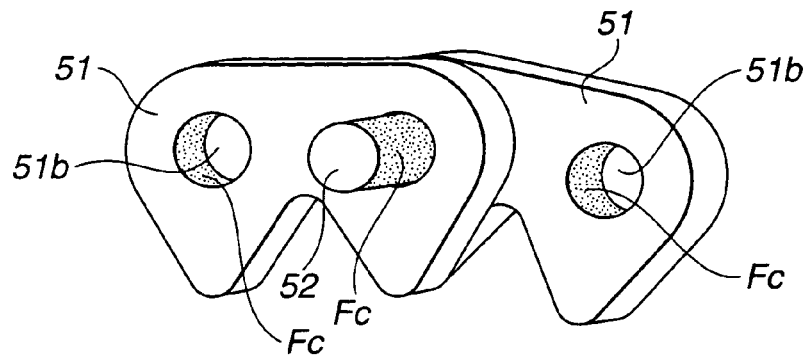
FIGS. 4A, 4B, 4C and 4D are examples of the formation of thin coating films of hard carbon on the silent chain of FIG. 2A FIGS. 5A, 5B, 5C and 5D are examples of the formation of thin coating films of hard carbon on the roller chain of FIG. 3A.

The outer cylindrical portion of pin 52 comes into sliding contact with the inner cylindrical portion of pin hole 51b. The outer cylindrical portions of pins 52 and the inner cylindrical portions of pin holes 51b are covered with hard carbon coatings Fc, respectively, as shown in FIG. 4A. Alternatively, either the outer cylindrical portions of pins 52 or the inner cylindrical portions of pin holes 51b may be covered with hard carbon coatings Fc.

Figure 4B:
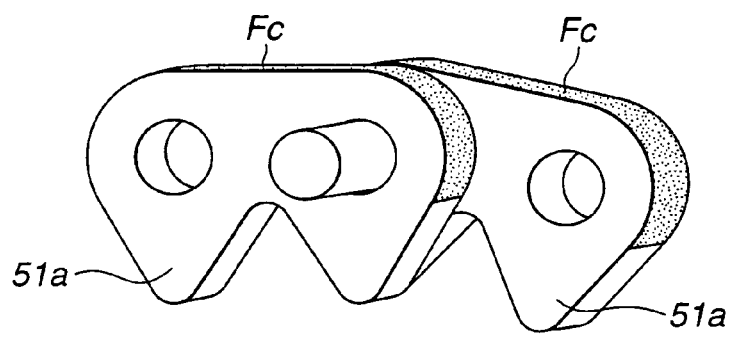

The outer lateral portion of chain plate 51 arranged at the outer radius side of chain 5 (opposite to the gear teeth side) comes into sliding contact with the guide portion of chain guide 7 and slack guide 8. As shown in FIG. 4B, the outer lateral portions of chain plates 51 are covered with hard carbon coatings Fc, respectively. It is alternatively possible to apply hard carbon coatings Fc to the guide portions of chain guide 7 and slack guide 8 with hard carbon coatings Fc instead of applying hard carbon coatings Fc to the outer lateral portions of chain plates 51, or possible to apply hard carbon coatings Fc to all of the outside lateral portions of chain plates 51 and the guide portions of chain guide 7 and slack guide 8.

Figure 4C:
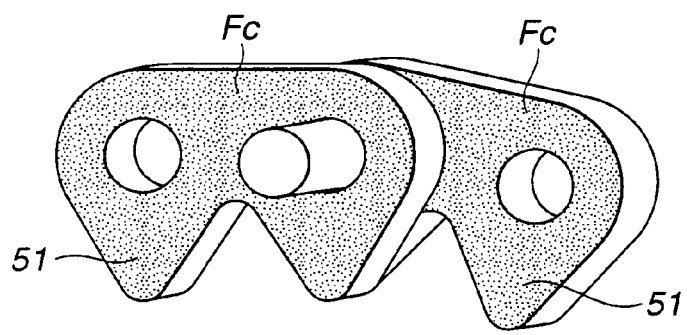

The opposite plate portions of each chain plate 51 come into sliding contact with the plate portions of any adjacent chain plates 51. The plate portions of chain plates 51 are covered with hard carbon coatings Fc, respectively, as shown in FIG. 4C. Alternatively, either one of the plate portions of each chain plate 51 may be covered with hard carbon coating Fc.

Figure 4D:
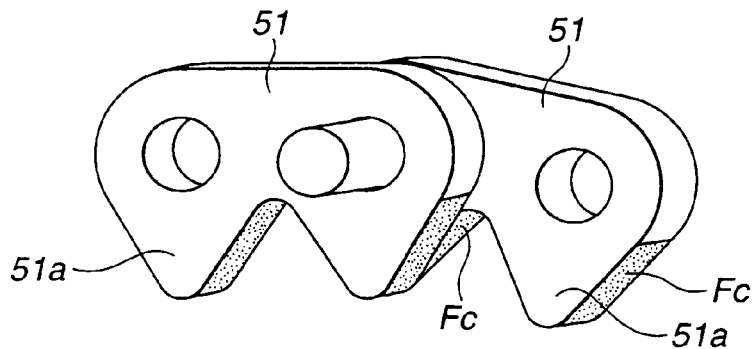

The gear teeth portion of chain plate 51 comes into sliding contact with the gear portions of sprockets 2, 3 and 4. As shown in FIG. 4D, the gear teeth portions of chain plates 51 are covered with hard carbon coatings Fc, respectively. It is alternatively possible to apply hard carbon coatings Fc to the gear portions of sprockets 2, 3 and 4 instead of applying hard carbon coatings Fc to the gear teeth portions of chain plates 51, or possible to apply hard carbon coatings Fc to all of the gear teeth portions of chain plates 51 and the gear portions of sprocket 2, 3 and 4.

Figure 3A:
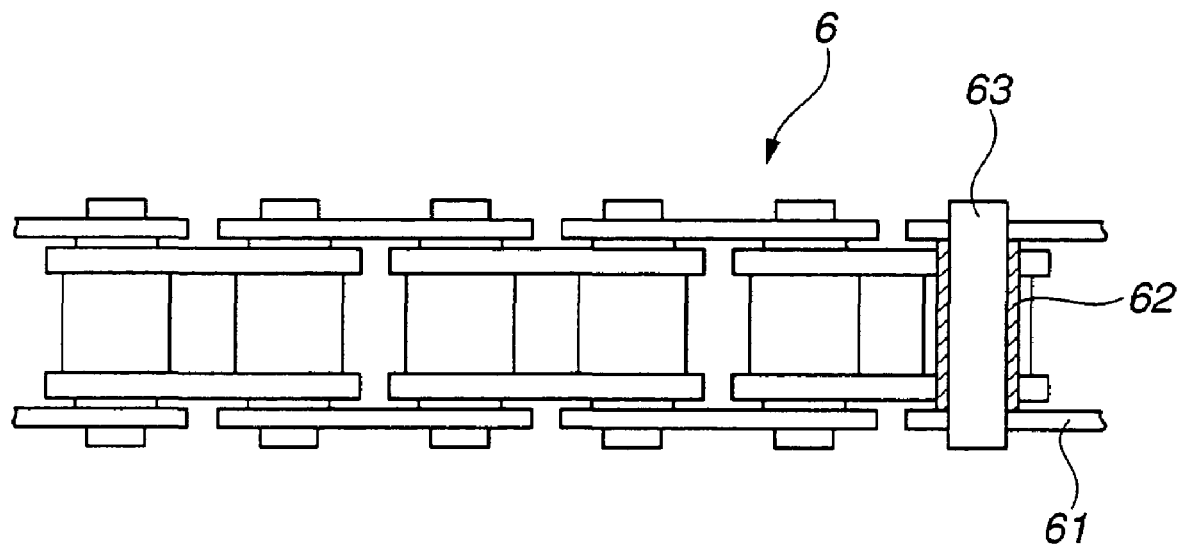
FIG. 3A is a plain view of a roller chain usable in the chain drive system of FIG. 1.
Figure 3B:
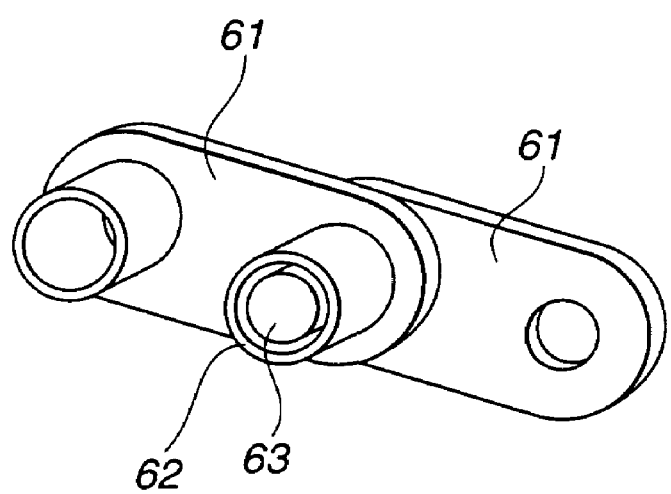
FIG. 3B is an enlarged perspective view of chain components of the roller chain of FIG. 3A.

As shown in FIGS. 3A and 3B, roller chain 6 has a plurality of oval chain plates 61 coupled together by bushings 62 and pins 63. (In this case, chain plates 61, bushings 62 and pins 63 act as the chain components.) Pin hole 61a is formed in each chain plate 61, and bushing 62 and pin 53 are slidably engaged in pin hole 61a to couple one chain plate 61 to another.

Figure 5A:
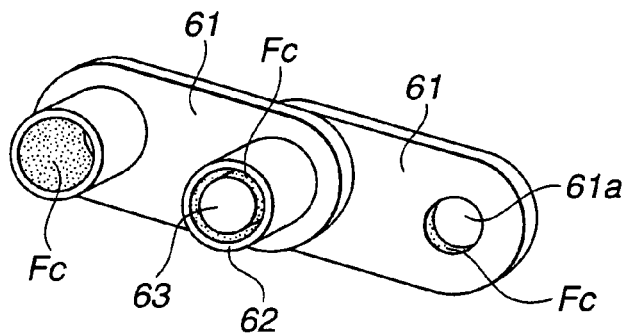

The outer cylindrical portion of pin 63 comes in sliding contact with the inner cylindrical portion of pin hole 61a and the inner cylindrical portion of bushing 62. The outer cylindrical portions of pins 63, the inner cylindrical portions of pin holes 61a and the inner cylindrical portions of bushings 62 are covered with hard carbon coatings Fc, respectively, as shown in FIG. 5A. Alternatively, either the outer cylindrical portions of pins 63 or the inner cylindrical portions of pin holes 61a and bushings 62 may be covered with hard carbon coatings Fc.

Figure 5B:
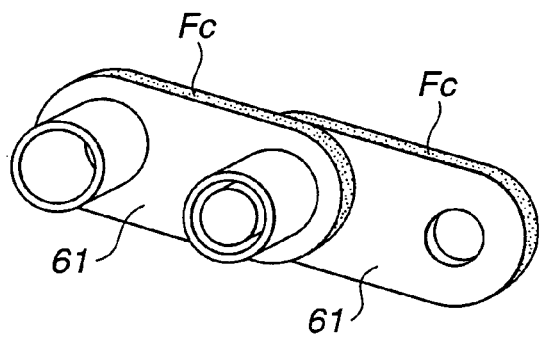

The outer lateral portion of chain plate 61 comes into sliding contact with the guide portions of chain guide 7 and slack guide 8. As shown in FIG. 5B, the outer lateral portions of chain plates 61 are covered with hard carbon coatings Fc, respectively. It is alternatively apply hard carbon coatings Fc to the guide portions of chain guide 7 and slack guide 8 instead of applying hard carbon coatings Fc to the outer lateral portions of chain plates 61, or possible to apply hard carbon coatings Fc to all of the outer lateral portions of chain plates 61 and the guide portions of chain guide 7 and slack guide 8.

Figure 5C:
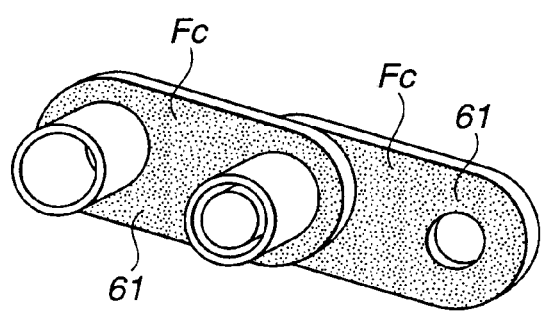

The opposite plate portions of chain plate 61 come into sliding contact with the plate portions of any adjacent chain plates 61. The plate portions of chain plates 61 are covered with hard carbon coatings Fc, respectively, as shown in FIG. 5C. Alternatively, either one of the plate portions of each chain plate 61 may be covered with hard carbon coating Fc.

Figure 5D:
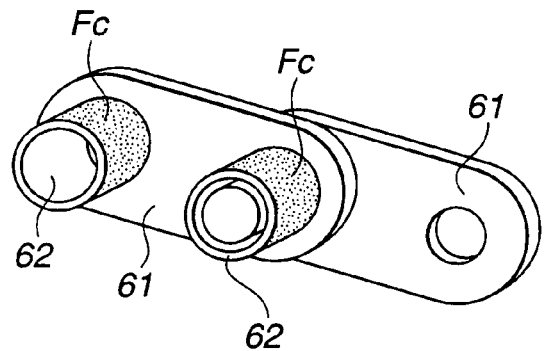

The outer cylindrical portion of bushing 62 comes into sliding contact with the gear portions of sprockets 2, 3 and 4. As shown in FIG. 5D, the outer cylindrical portions of bushings 62 are covered with hard carbon coatings Fc, respectively. It is alternatively possible to apply hard carbon coatings Fc to the gear portions of sprockets 2, 3 and 4 instead of applying hard carbon coatings Fc to the outer cylindrical portions of bushings 62, or possible to apply hard carbon coatings Fc to all of the outer cylindrical portions of bushings 62 and the gear portions of sprocket 2, 3 and 4.

Further, the bearing portion of slack guide 8 and the outer portion of pivot shaft 8a are slidable on each other. Although not specifically shown in the drawings, either or both of the bearing portion of slack guide 8 and the outer cylindrical portion of pivot shaft 8a are covered with hard carbon coatings Fc.

The outer portion of plunger 9a and the bearing portion of the tensioner body are also slidable on each other, and either or both of the outer portion of plunger 9a and the bearing portion of the tensioner body are covered with hard carbon coatings Fc.

Hard carbon coatings Fc are generally made of amorphous carbon material, such as diamond-like carbon (DLC) material, in which carbon elements exist in both $sp^2$ and $sp^3$ hybridizations to form a composite structure of graphite and diamond. Specific examples of the DLC material include hydrogen-free amorphous carbon (a-C), hydrogen-containing amorphous carbon (a-C:H) and/or metal carbide or metal carbon (MeC) that contains as a part a metal element of titanium (Ti) or molybdenum (Mo).

The coefficient of friction between any adjacent two sliding surfaces of sprockets 2, 3, 4, chain 5 or 6, chain guide 7, slack guide 8 and tensioner 9 increases with the hydrogen content of hard carbon coating Fc. It is thus preferable that hard carbon coatings Fc has a hydrogen content of 10 atomic % or less, more preferably 1.0 atomic % or less, in order to reduce the sliding friction between any adjacent two sliding surfaces of sprockets 2, 3, 4, chain 5 or 6, chain guide 7, slack guide 8 and tensioner 9 and thereby provide stable sliding characteristics for sprockets 2, 3, 4, chain 5 or 6, chain guide 7, slack guide 8 and tensioner 9. In the present embodiment, the hydrogen content of each hard carbon coating Fc is controlled to 1.0 atomic % or less. Such hard carbon coatings Fc low in hydrogen content can be formed a physical vapor deposition (PVD) process, e.g., arc ion plating, in which the coating atmosphere contains substantially no hydrogen and hydrogen-containing compounds. To lower the hydrogen content of hard carbon coatings Fc, it may be desirable to bake a reaction vessel and supporting fixtures and to clean the base portions of sprockets 2, 3, 4, chain 5 or 6, chain guide 7, slack guide 8 and tensioner 9 (i.e., the gear portions of sprockets 2, 3 and 4, the gear teeth portion, outer lateral portion and plate portions of chain plate 51, the outer cylindrical portion of pin 52, the inner cylindrical portion of pin hole 51b, the outer lateral portion and plate portions of chain plate 61, the outer cylindrical portion of pin 63, the inner cylindrical portion of pin hole 61a, the inner and outer cylindrical portions of bushing 62, the guide portion of chain guide 7 and slack guide 8, the bearing portion of slack guide 8, the outer portion of pivot shaft 8a, the outer portion of plunger 9a, the bearing portion of the tensioner body) before the formation of hard carbon coatings Fc.

Furthermore, the base portions of sprockets 2, 3, 4, chain 5 or 6, chain guide 7, slack guide 8 and tensioner 9 are preferably finished to have an average surface roughness Ra of not greater than 0.3 μm in a condition that hard carbon coatings Fc have not yet been formed on the base portions of sprockets 2, 3, 4, chain 5 or 6, chain guide 7, slack guide 8 and tensioner 9. If the surface roughness Ra exceeds 0.3 μm, the surface roughness projections of hard carbon coating Fc increase a local Hertz's contact pressure to the opposite sliding surface. This results in an increase of the occurrence of cracking in hard carbon coating Fc. Herein, the surface roughness Ra is explained as a center line average surface roughess "$Ra_{75}$" according to JIS B0601 in the present embodiment.

The lubricating oil is preferably prepared by blending a base oil with at least one of an ashless fatty-ester friction modifier and an ashless aliphatic-amine friction modifier so as to reduce the friction between the sliding parts effectively.

The base oil is not particularly limited, and can be selected from any commonly used lube base compounds, such as mineral oils, synthetic oils and fats.

Specific examples of the mineral oils include normal paraffin oils and paraffin-based or naphthene-based oils prepared by extracting lubricating oil fractions from petroleum by atmospheric or reduced-pressure distillation, and then, purifying the obtained lubricating oil fractions with any of the following treatments: solvent deasphalting, solvent extraction, hydrocracking, solvent dewaxing, hydro-refining, wax isomerization, surfuric acid treatment and clay refining. Although the lubricating oil fraction is generally purified by hydro- or solvent-refining, it is preferable to use the mineral oil prepared by purifying the lubricating oil fraction with deep hydrocraking process or GTL (Gas-to-Liquid) wax isomerization process for reduction of an aromatics content in the oil.

Specific examples of the synthetic oils include: poly-α-olefins (PAO), such as 1-octene oligomer, 1-decene oligomer and ethylene-propylene oligomer, and hydrogenated products thereof; isobutene oligomer and hydrogenated product thereof; isoparaffines; alkylbenzenes; alkylnaphthalenes; diesters, such as ditridecyl glutarate, dioctyl adipate, diisodecyl adipate, ditridecyl adipate and dioctyl sebacate; polyol esters, such as trimethylolpropane esters (e.g. trimethylolpropane caprylate, trimetylolpropane pelargonate and trimethylolpropane isostearate) and pentaerytlritol esters (e.g. pentaerythritol-2-ethyl hexanoate and pentaerythritol pelargonate); polyoxyalkylene glycols; dialkyl diphenyl ethers; and polyphenyl ethers. Among others, preferred are poly-α-olefins, such as 1-octene oligomer and 1-decene oligomer, and hydrogenated products thereof.

The above base oil compounds can be used alone or in combination thereof. In the case of using as the base oil a mixture of two or more base oil compounds, there is no particular limitation to the mixing ratio of the base oil compounds.

The sulfur content of the base oil is not particularly restricted, and is preferably 0.2% or less, more preferably 0.1% or less, still more preferably 0.05% or lower, based on the total mass of the base oil. It is desirable to use the hydro-refined mineral oil or the synthetic oil because the hydro-refined mineral oil and the synthetic oil each have a sulfur content of not more than 0.005% or substantially no sulfur content (not more than 5 ppm).

The aromatics content of the base oil is not also particularly restricted. Herein, the aromatics content is defined as the amount of an aromatics fraction determined according to ASTM D2549. In order for the lubricating oil to maintain low-friction characteristics suitably for use in an internal combustion engine over an extended time period, the aromatic content of the base oil is preferably 15% or less, more preferably 10% or less, and still more preferably 5% or less, based on the total mass of the base oil. The lubricating oil undesirably deteriorates in oxidation stability when the aromatics content of the base oil exceeds 15%.

The kinematic viscosity of the base oil is not particularly restricted. To use the lubricating oil in an internal combustion engine, the kinematic viscosity of the base oil is preferably 2 $mm^2/s$ or higher, more preferably 3 $mm^2/s$ or higher, and at the same time, is preferably 20 $mm^2/s$ or lower, more preferably 10 $mm^2/s$ or lower, still more preferably 8 $mm^2/s$ or lower, as measured at 100° C. When the kinematic viscosity of the base oil is less than 2 $mm^2/s$ at 100° C., there is a possibility that the lubricating oil fails to provide sufficient wear resistance and causes a considerable evaporation loss. When the kinematic viscosity of the base oil exceeds 20 $mm^2/s$ at 100° C., there is a possibility that the lubricating oil fails to provide low-friction characteristics and deteriorates in low-temperature performance.

In the case of using two or more base oil compounds in combination, it is not necessary to limit the kinematic viscosity of each base oil compound to within such a specific range so for as the kinematic viscosity of the mixture of the base oil compounds at 100° C. is in the above-specified range.

The viscosity index of the base oil is not particularly restricted, and is preferably 80 or higher, more preferably 100 or higher, most preferably 120 or higher, to use the lubricating oil in an internal combustion engine. When the base oil has a higher viscosity index, the lubricating oil becomes less consumed and can attain good low-temperature viscosity properties.

As the fatty-ester friction modifier and the aliphatic-amine friction modifier, there may be used fatty acid esters and aliphatic amines each having $C_6$-$C_{30}$ straight or branched hydrocarbon chains, preferably $C_8$-$C_{24}$ straight or branched hydrocarbon chains, more preferably $C_{10}$-$C_{20}$ straight or branched hydrocarbon chains. When the carbon number of the hydrocarbon chain of the friction modifier is not within the range of 6 to 30, there arises a possibility of failing to produce a desired friction reducing effect. Specific examples of the $C_6$-$C_{30}$ straight or branched hydrocarbon chains of the fatty-ester and aliphatic-amine friction modifiers include: alkyl groups, such as hexyl, heptyl, octyl, nonyl, decyl, undecyl, dodecyl, tridecyl, tetradecyl, pentadecyl, hexadecyl, heptadecyl, octadecyl, nonadecyl, icosyl, heneicosyl, docosyl, tricosyl, tetracosyl, pentacosyl, hexacosyl, heptacosyl, octacosyl, nonacosyl and triacontyl; and alkenyl groups, such as hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, icosenyl, heneicosenyl, docosenyl, tricosenyl, tetracosenyl, pentacosenyl, hexacosenyl, heptacosenyl, octacosenyl, nonacosenyl and triacontenyl. The above alkyl and alkenyl groups include all possible isomers.

The fatty acid esters are preferably exemplified by esters of fatty acids having the above $C_6$-$C_{30}$ hydrocarbon groups and monohydric or polyhydric aliphatic alcohols. Specific examples of such fatty acid esters include glycerol monooleate, glycerol dioleate, sorbitan monooleate and sorbitan dioleate.

The aliphatic amines are preferably exemplified by aliphatic monoamines and alkylene oxide adducts thereof, aliphatic polyamines, imidazolines and derivatives thereof each having the above $C_6$-$C_{30}$ hydrocarbon groups. Specific examples of such aliphatic amines include: aliphatic amine compounds, such as laurylamine, lauryldiethylamine, lauryldiethanolamine, dodecyldipropanolamine, palmitylamine, stearylamine, stearyltetraethylenepentamine, oleylamine, oleylpropylenediamine, oleyldiethanolamine and N-hydroxyethyloleylimidazolyne; alkylene oxide adducts of the above aliphatic amine compounds, such as N,N-dipolyoxyalkylene-N-alkyl or alkenyl ($C_6$-$C_{28}$) amines; and acid-modified compounds prepared by reacting the above aliphatic amine compounds with $C_2$-$C_{30}$ monocarboxylic acids (such as fatty acids) or $C_2$-$C_{30}$ polycarboxylic acids (such as oxalic acid, phthalic acid, trimellitic acid and pyromellitic acid) so as to neutralize or amidate the whole or part of the remaining amino and/or imino groups. Above all, N,N-dipolyoxyethylene-N-oleylamine is preferably used.

The amount of the fatty-ester friction modifier and/or the aliphatic-amine friction modifier contained in the lubricating oil is not particularly restricted, and is preferably 0.05 to 3.0%, more preferably 0.1 to 2.0%, and most preferably 0.5 to 1.4%, based on the total mass of the lubricating oil. When the amount of the fatty-ester friction modifier and/or the aliphatic-amine friction modifier in the lubricating oil is less than 0.05%, there is a possibility of failing to obtain a sufficient friction reducing effect. When the amount of the fatty-ester friction modifier and/or the aliphatic-amine friction modifier in the lubricating oil exceeds 3.0%, there is a possibility that the solubility of the friction modifier or modifiers in the base oil becomes so low that the lubricating oil deteriorates in storage stability to cause precipitations.

The lubricating oil may preferably include polybutenyl succinimide and/or a derivative thereof.

As the polybutenyl succinimide, there may be used compounds represented by the following general formulas (1) and (2).

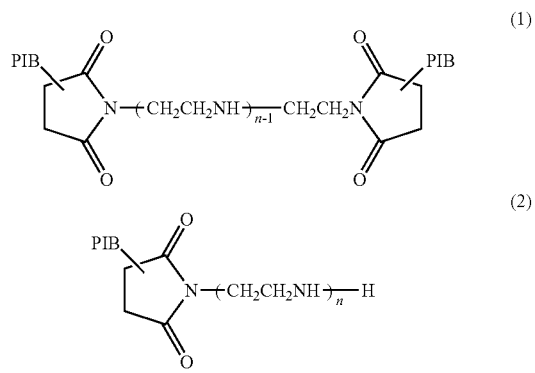

In the formulas (1) and (2), PIB represents a polybutenyl group derived from polybutene having a number-average molecular weight of 900 to 3500, preferably 1000 to 2000, that can be prepared by polymerizing high-purity isobutene or a mixture of 1-butene and isobutene in the presence of a boron fluoride catalyst or aluminum chloride catalyst. When the number-average molecular weight of the polybutene is less than 900, there is a possibility of failing to provide a sufficient detergent effect. When the number-average molecular weight of the polybutene exceeds 3500, the polybutenyl succinimide tends to deteriorate in low-temperature fluidity. The polybutene may be purified, before used for the production of the polybutenyl succinimide, by removing trace amounts of fluorine and chlorine residues resulting from the above polybutene production catalyst with any suitable treatment (such as adsorption process or washing process) in such a way as to control the amount of the fluorine and chlorine residues in the polybutene to 50 ppm or less, desirably 10 ppm or less, more desirably 1 ppm or less.

Further, n represents an integer of 1 to 5, preferably 2 to 4, in the formulas (1) and (2) in the formulas (1) and (2) in view of the detergent effect.

The production method of the polybutenyl succinimide is not particularly restricted. For example, the polybutenyl succinimide can be prepared by reacting a chloride of the polybutene, or the polybutene from which fluorine and chlorine residues are sufficiently removed, with maleic anhydride at 100 to 200° C. to form polybutenyl succinate, and then, reacting the polybutenyl succinate with polyamine (such as diethylene triamine, triethylene tetramine, tetraethylene pentamine or pentaethylene hexamine).

As the polybutenyl succinimide derivative, there may be used boron- or acid-modified compounds obtained by reacting the polybutenyl succinimides of the formula (1) or (2) with boron compounds or oxygen-containing organic compounds so as to neutralize or amidate the whole or part of the remaining amino and/or imide groups. Among others, boron-containing polybutenyl succinimides, especially boron-containing bis(polybutenyl)succinimide, are preferably used. The content ratio of nitrogen to boron (B/N) by mass in the boron-containing polybutenyl succinimide compound is usually 0.1 to 3, preferably 0.2 to 1.

The boron compound used for producing the polybutenyl succinimide derivative can be a boric acid, a borate or a boric acid ester. Specific examples of the boric acid include orthoboric acid, metaboric acid and tetraboric acid. Specific examples of the borate include: ammonium salts, such as ammonium borates, e.g., ammonium metaborate, ammonium tetraborate, ammonium pentaborate and ammonium octaborate. Specific examples of the boric acid ester include: esters of boric acids and alkylalcohols (preferably $C_1$-$C_6$ alkylalcohols), such as monomethyl borate, dimethyl borate, trimethyl borate, monoethyl borate, diethyl borate, triethyl borate, monopropyl borate, dipropyl borate, tripropyl borate, monobutyl borate, dibutyl borate and tributyl borate.

The oxygen-containing organic compound used for producing the polybutenyl succinimide derivative can be any of $C_1$-$C_{30}$ monocarboxylic acids, such as formic acid, acetic acid, glycolic acid, propionic acid, lactic acid, butyric acid, valeric acid, caproic acid, enanthic acid, caprylic acid, pelargonic acid, capric acid, undecylic acid, lauric acid, tridecanoic acid, myristic acid, pentadecanoic acid, palmitic acid, margaric acid, stearic acid, oleic acid, nonadecanoic acid and eicosanoic acid; $C_2$-$C_{30}$ polycarboxylic acids, such as oxalic acid, phthalic acid, trimellitic acid and pyromellitic acid, and anhydrides and esters thereof; $C_2$-$C_6$ alkylene oxides; and hydroxy(poly)oxyalkylene carbonates.

The amount of the polybutenyl succinimide and/or polybutenyl succinimide derivative contained in the lubricating oil is not particularly restricted, and is preferably 0.1 to 15%, more preferably 1.0 to 12%, based on the total mass of the lubricating oil. When the amount of the polybutenyl succineimide and/or polybutenyl succinimide derivative in the lubricating oil is less than 0.1%, there is a possibility of failing to attain a sufficient detergent effect. When the amount of the polybutenyl succineimide and/or polybutenyl succinimide derivative in the lubricating oil exceeds 15%, the lubricating oil may deteriorate in demulsification ability. In addition, it is uneconomical to add such a large amount of the polybutenyl succineimide and/or polybutenyl succinimide derivative in the lubricating oil.

Further, the lubricating oil may preferably include zinc dithiophosphate.

As the zinc dithiophosphate, there may be used compounds represented by the following general formula (3).

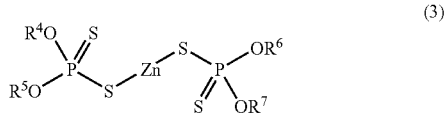
(3)

In the formula (3), $R^4$, $R^5$, $R^6$ and $R^7$ each represent $C_1$-$C_{24}$ hydrocarbon groups. The $C_1$-$C_{24}$ hydrocarbon group is preferably a $C_1$-$C_{24}$ straight- or branched-chain alkyl group, a $C_3$-$C_{24}$ straight- or branched-chain alkenyl group, a $C_5$-$C_{13}$ cycloalkyl or straight- or branched-chain alkylcycloalkyl group, a $C_6$-$C_{18}$ aryl or straight- or branched-chain alkylaryl group or a $C_7$-$C_{19}$ arylalkyl group. The above alkyl group or alkenyl group can be primary, secondary or tertiary. Specific examples of $R^4$, $R^5$, $R^6$ and $R^7$ include: alkyl groups, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, heneicosyl, docosyl, tricosyl and tetracosyl; alkenyl groups, such as propenyl, isopropenyl, butenyl, butadienyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl (oleyl), nonadecenyl, icosenyl, heneicosenyl, docosenyl, tricosenyl and tetracosenyl; cycloalkyl groups, such as cyclopentyl, cyclohexyl and cycloheptyl; alkylcycloalkyl groups, such as methylcyclopentyl, dimethylcyclopentyl, ethylcyclopentyl, propylcyclopentyl, ethylmethylcyclopentyl, trimethylcyclopentyl, diethylcyclopentyl, ethyldimethylcyclopentyl, propylmethylcyclopentyl, propylethylcyclopentyl, di-propylcyclopentyl, propylethylmethylcyclopentyl, methylcyclohexyl, dimethylcyclohexyl, ethylcyclohexyl, propylcyclohexyl, ethylmethylcyclohexyl, trimethylcyclohexyl, diethylcyclohexyl, ethyldimethylcyclohexyl, propylmethylcyclohexyl, propylethylcyclohexyl, di-propylcyclohexyl, propylethylmethylcyclohexyl, methylcycloheptyl, dimethylcycloheptyl, ethylcycloheptyl, propylcycloheptyl, ethylmethylcycloheptyl, trimethylcycloheptyl, diethylcycloheptyl, ethyldimethylcycloheptyl, propylmethylcycloheptyl, propylethylcycloheptyl, di-propylcycloheptyl and propylethylmethylcycloheptyl; aryl groups, such as phenyl and naphthyl; alkylaryl groups, such as tolyl, xylyl, ethylphenyl, propylphenyl, ethylmethylphenyl, trimethylphenyl, butylphenyl, propylmethylphenyl, diethylphenyl, ethyldimethylphenyl, tetramethylphenyl, pentylphenyl, hexylphenyl, heptylphenyl, octylphenyl, nonylphenyl, decylphenyl, undecylphenyl and dodecylphenyl; and arylalkyl groups, such as benzyl, methylbenzyl, dimethylbenzyl, phenethyl, methylphenethyl and dimethylphenethyl. The above hydrocarbon groups include all possible isomers. Above all, preferred are $C_1$-$C_{18}$ straight- or branched-chain alkyl group and $C_6$-$C_{18}$ aryl or straight- or branched-chain alkylaryl group.

The zinc dithiophosphate compounds are preferably exemplified by zinc diisopropyldithiophosphate, zinc diisobutyldithiophosphate, zinc di-sec-butyldithiophosphate, zinc di-sec-pentyldithiophosphate, zinc di-n-hexyldithiophosphate, zinc di-sec-hexyldithiophosphate, zinc di-octyldithiophosphate, zinc di-2-ethylhexyldithiophosphate, zinc di-n-decyldithiophosphate zinc di-n-dodecyldithiophosphate, and zinc diisotridecyldithiophosphate.

The amount of the zinc dithiophosphate contained in the lubricating oil is not particularly restricted. In order to obtain a larger friction reducing effect, the zinc dithiophosphate is preferably contained in an amount of 0.1% or less, more preferably in an amount of 0.06% or less, most preferably in a minimum effective amount, in terms of the phosphorus element based on the total mass of the lubricating oil. When the amount of the zinc dithiophosphate in the lubricating oil exceeds 0.1%, there is a possibility of inhibiting the friction reducing effect of the ashless fatty-ester friction modifier and/or the ashless aliphatic-amine friction modifier.

The production method of the zinc dithiophosphate is not particularly restricted, and the zinc dithiophosphate can be prepared by any known method. For example, the zinc dithiophosphate may be prepared by reacting alcohols or phenols having the above $R^4$, $R^5$, $R^6$ and $R^7$ hydrocarbon groups with phosphorous pentasulfide ($P_2O_5$) to form dithiophosphoric acid, and then, neutralizing the dithiophosphoric acid with zinc oxide. It is noted that the molecular structure of zinc dithiophosphate differs according to the alcohols or phenols used as a raw material for the zinc dithiophosphate production.

The above zinc dithiophosphate compounds can be used alone or in the form of a mixture of two or more thereof. In the case of using two or more zinc dithiophosphate compounds in combination, there is no particular limitation to the mixing ratio of the zinc dithiophosphate compounds.

The above-specified lubricating oil produces a large friction reducing effect on the sliding friction between any two opposite sliding surfaces of the system parts 2, 3, 4, 5 or 6, 7, 8 and 9 especially when either or both of the opposite system parts 2, 3, 4, 5 or 6, 7, 8 and 9 are covered with hard carbon coatings Fc.

In order to improve the properties required of the lubricating oil for use in an internal combustion engine, the lubricating oil may further contain any other additive or additives, such as a metallic detergent, an antioxidant, a viscosity index improver, a friction modifier other than the above-mentioned fatty-ester friction modifier and aliphatic-amine friction modifier, an ashless dispersant other than the above-mentioned polybutenyl succinimide and polybutenyl succinimide derivative, an anti-wear agent or extreme-pressure agent, a rust inhibitor, a nonionic surfactant, a demulsifier, a metal deactivator and/or an anti-foaming agent.

The metallic detergent can be selected from any metallic detergent compound commonly used for engine lubricants. Specific examples of the metallic detergent include sulfonates, phenates and salicylates of alkali metals, such as sodium (Na) and potassium (K), or alkali-earth metals, such as calcium (Ca) and magnesium (Mg); and a mixture of two or more thereof. Among others, sodium and calcium sulfonates, sodium and calcium phenates, and sodium and calcium salicylates are suitably used. The total base number and amount of the metallic detergent can be selected in accordance with the properties required of the lubricating oil. The total base number of the metallic detergent is usually 0 to 500 mgKOH/g, preferably 150 to 400 mgKOH/g, as measured by perchloric acid method according to ISO 3771. The amount of the metallic detergent is usually 0.1 to 10% based on the total mass of the lubricating oil.

The antioxidant can be selected from any antioxidant compounds commonly used for engine lubricants. Specific examples of the antioxidant include: phenolic antioxidants, such as 4,4'-methylenebis(2,6-di-tert-butylphenol) and octadecyl-3-(3,5-di-tert-butyl-4-hydroxyphenyl)propionate; amino antioxidants, such as phenyl-$\alpha$-naphthylamine, alkylphenyl-$\alpha$-naphthylamine and alkyldiphenylamine; and mixtures of two or more thereof. The amount of the antioxidant is usually 0.01 to 5% based on the total mass of the lubricating oil.

As the viscosity index improver, there may be used: non-dispersion type polymethacrylate viscosity index improvers, such as copolymers of one or more kinds of methacrylates and hydrogenated products thereof; dispersion type polymethacrylate viscosity index improvers, such as copolymers of methacrylates further including nitrogen compounds; and other viscosity index improvers, such as copolymers of ethylene and $\alpha$-olefins (e.g. propylene, 1-butene and 1-pentene) and hydrogenated products thereof, polyisobutylenes and hydrogenated products thereof, styrene-diene hydrogenated copolymers, styrene-maleate anhydride copolymers and polyalkylstyrenes. The molecular weight of the viscosity index improver needs to be selected in view of the shear stability. For example, the number-average molecular weight of the viscosity index improver is desirably in a range of 5000 to 1000000, more desirably 100000 to 800000, for the dispersion or non-dispersion type polymethacrylate; in a range of 800 to 5000 for the polyisobutylene or hydrogenated product thereof; and in a range of 800 to 300000, more desirably 10000 to 200000 for the ethylene/$\alpha$-olefin copolymer or hydrogenated product thereof. The above viscosity index improving compounds can be used alone or in the form of a mixture of two or more thereof. The amount of the viscosity index improver is preferably 0.1 to 40.0% based on the total mass of the lubricating oil.

The friction modifier other than the above-mentioned fatty-ester friction modifier and aliphatic-amine friction modifier can be exemplified by ashless friction modifiers, such as boric acid esters, higher alcohols and aliphatic ethers, and metallic friction modifiers, such as molybdenum dithiophosphate, molybdenum dithiocarbamate and molybdenum disulfide.

The ashless dispersant other than the above-mentioned polybutenyl succinimide and polybutenyl succinimide derivative can be any of polybutenylbenzylamines and polybutenylamines each having polybutenyl groups of which the number-average molecular weight is 900 to 3500, polybutenyl succinimides having polybutenyl groups of which the number-average molecular weight is less than 900, and derivatives thereof.

As the anti-friction agent or extreme-pressure agent, there may be used: disulfides, sulfurized fats, olefin sulfides, phosphate esters having one to three $C_2$-$C_{20}$ hydrocarbon groups, thiophosphate esters, phosphite esters, thiophosphite esters and amine salts of these esters.

As the rust inhibitor, there may be used: alkylbenzene sulfonates, dinonylnaphthalene sulfonates, esters of alkenylsuccinic acids and esters of polyalcohols.

As the nonionic surfactant and demulsifier, there may be used: nonionic polyalkylene glycol surfactants, such as polyoxyethylene alkylethers, polyoxyethylene alkylphenylethers and polyoxyethylene alkylnaphthylethers.

The metal deactivator can be exemplified by imidazolines, pyrimidine derivatives, thiazole and benzotriazole.

The anti-foaming agent can be exemplified by silicones, fluorosilicones and fluoroalkylethers.

Each of the friction modifier other than the fatty-ester and aliphatic-amine friction modifiers, the ashless dispersant other than the polybutenyl succinimide and polybutenyl succinimide derivative, the anti-wear agent or extreme-pressure agent, the rust inhibitor and the demulsifier is usually contained in an amount of 0.01 to 5% based on the total mass of the lubricating oil, the metal deactivator is usually contained in an amount of 0.005 to 1% based on the total mass of the lubricating oil, and the anti-foaming agent is usually contained in an amount of 0.0005 to 1% based on the total mass of the lubricating oil.

As described above, either or both of the opposite sliding surfaces between the chain components 51, 52, or 61, 62, 63 have hard carbon coatings Fc low in hydrogen content according to the present embodiment. The chain components 51, 52, or 61, 62, 63 are thus allowed to slide relative to each other with less friction resistance and wear in the presence of the above-specified lubricating oil. This makes it possible to reduce energy loss and noise caused by the movement of chain 5, 6, prevent the elongation of chain 5, 6 due to wear and thereby improve the durability of chain 5, 6. Especially when chain drive system 1 is used to control the timing of transmitting the rotation of a drive shaft (i.e. a crankshaft) to a driven shaft (i.e. a valve driving camshaft) in an internal combustion engine, the performance deteriorations (such as control timing delay) of the engine can be prevented from occurring due to the chain elongation. Further, the formation of hard carbon coating Fc allows a decrease in the pressure-receiving area of chain 5, 6 in a case where the allowable level of chain elongation is set constant. The width of chain 5, 6 and the diameter of pins 52, 63 can be thus made smaller for the miniaturization of chain drive system 1. Although a conventional chain is subjected to a surface finishing process (e.g. fineblanking) so as to avoid chain elongation, there is no need to perform such a surface finishing process on chain 5, 6 according to the present embodiment. This results in cost reduction. Also, chain 5 or 6 are allowed to slide relative to sprockets 2, 3, 4, chain guide 7 and slack guide 8 with less friction and wear in the presence of the above-specified lubricating oil. This also makes it possible to reduce possible to reduce energy loss and noise caused by the sliding contact of chain 5, 6 with sprockets 2, 3, 4, chain guide 7 and slack guide 8 and to lower the wear-resistant grades of the materials of chain 5 or 6, sprockets 2, 3, 4, chain guide 7 and slack guide 8 for cost reduction.

Similarly, at least one of the opposite sliding surfaces between slack guide 8 and pivot shaft 8a and at least one of the opposite sliding surfaces between the tensioner body and plunger 9a have hard carbon coatings Fc low in hydrogen content according to the present embodiment. This makes it possible to reduce the pivot friction of slack guide 8 and improve the response of tensioner 9 to the input from chain 5, 6, thereby increasing the performance of chain drive system 1. In addition, the clearance between the tensioner body and plunger 9a can be decreased to avoid the occurrence of oil leakage during an engine stop and thereby improve the responsivity of tensioner 9 at an engine start. This makes it possible to avoid abnormal sounds due to the flap of chain 5, 6 etc.

Chain drive system 1 can therefore attain good low-friction characteristics and durability and provide, when chain drive system 1 is used to control the timing of transmitting the rotation of a drive shaft (i.e. a crankshaft) to a driven shaft (i.e. a valve driving camshaft) in an internal combustion engine, great improvements in engine performance and fuel efficiency without secular deteriorations.

It should be noted that hard carbon coatings Fc can be applied to any other sliding machine parts. For example, it has been proved that, when hard carbon coatings Fc are applied to a sliding portion between a crankpin and the crankpin bearing (called "big end") of a connecting rod and to a sliding portion between a crankshaft bearing and a crank journal, the sliding friction between these engine parts can be reduced by about 70% to obtain a nearly 2.2% improvement in engine fuel efficiency without any loss of the seizure resistant of the engine parts.

The entire contents of Japanese Patent Application No. 2003-207494 (filed on Aug. 13, 2003) are herein incorporated by reference.

Although the present invention has been described with reference to specific embodiments of the invention, the invention is not limited to the above-described embodiments. Various modification and variation of the embodiments described above will occur to those skilled in the art in light of the above teaching. The scope of the invention is defined with reference to the following claims.

Nissan Motor Co., Ltd. and Nippon Oil Corporation are parties to a joint research agreement.

What is claimed is:

1. A chain drive system, comprising:
   a drive sprocket;
   a driven sprocket;
   a chain looped over the drive sprocket and the driven sprocket;
   the chain and the sprocket having respective sliding surfaces slidable relative to each other in the presence of lubricating oil;
   any adjacent chain components of the chain having respective sliding surfaces slidable relative to each other in the presence of lubricating oil;
   at least one of said sliding surfaces between the chain and the sprocket and at least one of said sliding surfaces between any adjacent chain components comprising hard carbon coatings formed on base portions thereof;
   each of the hard carbon coatings having a hydrogen content of 10 atomic % or less; and
   wherein the lubricating oil comprises at least one friction modifier selected from the group consisting of an ashless fatty-ester friction modifier and an ashless aliphatic-amine friction modifier.

2. A chain drive system according to claim 1, further comprising a chain guide that guides the chain in a chain drive direction;
   the chain and the chain guide comprising respective sliding surfaces slidable relative to each other in the presence of lubricating oil; and
   at least one of said sliding surfaces between the chain and the chain guide comprising a hard carbon coating formed on a base portion thereof with a hydrogen content of 10 atomic % or less.

3. A chain drive system according to claim 1, further comprising:
   a slack guide supported pivotally;
   a tensioner comprising a tensioner body and a plunger slidably engaged in the tensioner body to press the slack guide against the chain;
   the chain and the slack guide comprising respective sliding surfaces slidable relative to each other in the presence of lubricating oil; and
   at least one of said sliding surfaces between the chain and the slack guide comprising a hard carbon coating formed on a base portion thereof with a hydrogen content of 10 atomic % or less.

4. A chain drive system according to claim 3, further comprising a pivot shaft to support the slack guide in such a manner that the slack guide pivots about the pivot shaft;
   the slack guide and the pivot shaft comprising respective sliding surfaces slidable relative to each other in the presence of lubricating oil; and
   at least one of said sliding surfaces between the slack guide and the pivot shaft comprising a hard carbon coating formed on a base portion thereof with a hydrogen content of 10 atomic % or less.

5. A chain drive system according to claim 3,
   the tensioner body and the plunger comprising respective sliding surfaces slidable relative to each other in the presence of lubricating oil; and
   at least one of said sliding surfaces between the tensioner body and the plunger comprising a hard carbon coating formed on a base portion thereof with a hydrogen content of 10 atomic % or less.

6. A chain drive system according to claim 1, wherein each of the hard carbon coatings has a hydrogen content of 1.0 atomic % or less.

7. A chain drive system according to claim 1, wherein said at least one friction modifier comprises a C6-C30 hydrocarbon group in an amount of 0.05 to 3.0% by mass based on a total mass of the lubricating oil.

8. A chain drive system according to claim 1, wherein the lubricating oil comprises polybutenyl succinimide and/or a derivative thereof.

9. A chain drive system according to claim 8, wherein the lubricating oil comprises polybutenyl succinimide and/or derivative thereof in an amount of 0.1 to 15% by mass based on a total mass of the lubricating oil.

10. A chain drive system according to claim 1, wherein the lubricating oil comprises zinc dithiophosphate in an amount of 0.1% or less by mass in terms of phosphorus element based on a total mass of the lubricating oil.

11. A chain drive system according to claim 1, wherein the hard carbon coatings are formed by arc ion plating.

12. A chain drive system according to claim 1, wherein at least one of said base portions has a surface roughness Ra of 0.03 μm or smaller in a condition that the hard carbon coating has not yet been formed on the base portion.

13. A chain drive system, comprising:
a drive sprocket;
a driven sprocket;
a chain looped over the drive sprocket and the driven sprocket;
the chain and the sprocket having respective sliding surfaces slidable relative to each other;
any adjacent chain components of the chain comprising respective sliding surfaces slidable relative to each other;
at least one of said sliding surfaces between the chain and the sprocket and at least one of said sliding surfaces between any adjacent chain components comprising hard carbon coatings formed on base portions thereof;
each of the hard carbon coatings having a hydrogen content of 10 atomic % or less; and
a lubricating oil comprising at least one friction modifier selected from the group consisting of an ashless fatty-ester friction modifier and an ashless aliphatic-amine friction modifier and being supplied to lubricate said sliding surfaces between the chain and the sprocket and said sliding surfaces between any adjacent chain components.

14. A chain drive system according to claim 13, further comprising a chain guide that guides the chain in a chain drive direction;
the chain and the chain guide comprising respective sliding surfaces slidable relative to each other;
at least one of said sliding surfaces between the chain and the chain guide comprising a hard carbon coating formed on a base portion thereof with a hydrogen content of 10 atomic % or less; and
the lubricating oil being further supplied to lubricate said sliding surfaces between the chain and the chain guide.

15. A chain drive system according to claim 13, further comprising:
a slack guide supported pivotally;
a tensioner having a tensioner body and a plunger slidably engaged in the tensioner body to press the slack guide against the chain;
the chain and the slack guide comprising respective sliding surfaces slidable relative to each other;
at least one of said sliding surfaces between the chain and the slack guide comprising a hard carbon coating formed on a base portion thereof with a hydrogen content of 10 atomic % or less; and
the lubricating oil being further supplied to lubricate said sliding surfaces between the chain and the slack guide.

16. A chain drive system according to claim 15, further comprising a pivot shaft to support the slack guide in such a manner that the slack guide pivots about the pivot shaft;
the slack guide and the pivot shaft comprising respective sliding surfaces slidable relative to each other;
at least one of said sliding surfaces between the slack guide and the pivot shaft comprising a hard carbon coating formed on a base portion thereof with a hydrogen content of 10 atomic % or less; and
the lubricating oil being further supplied to lubricate said sliding surfaces between the slack guide and the pivot shaft.

17. A chain drive system according to claim 15,
the tensioner body and the plunger comprising respective sliding surfaces slidable relative to each other;
at least one of said sliding surfaces between the tensioner body and the plunger comprising a hard carbon coating formed on a base portion thereof with a hydrogen content of 10 atomic % or less; and
the lubricating oil being supplied to lubricate said sliding surfaces between the tensioner body and the plunger.

18. A chain drive system according to claim 13, wherein each of the hard carbon coatings has a hydrogen content of 1.0 atomic % or less.

19. A chain drive system according to claim 13, wherein said at least one friction modifier comprises a C6-C30 hydrocarbon group in an amount of 0.05 to 3.0% by mass based on a total mass of the lubricating oil.

20. A chain drive system according to claim 14, wherein the lubricating oil comprises polybutenyl succinimide and/or a derivative thereof.

21. A chain drive system according to claim 20, wherein the lubricating oil comprises polybutenyl succinimide and/or derivative thereof in an amount of 0.1 to 15% by mass based on a total mass of the lubricating oil.

22. A chain drive system according to claim 13, wherein the lubricating oil comprises zinc dithiophosphate in an amount of 0.1% or less by mass in terms of phosphorus element based on a total mass of the lubricating oil.

23. A chain drive system according to claim 13, wherein the hard carbon coatings are formed by arc ion plating.

24. A chain drive system according to claim 13, wherein at least one of said base portions has a surface roughness Ra of 0.03 μm or smaller in a condition that the hard carbon coating has not yet been formed on the base portion.

* * * * *